(12) United States Patent
Ritchie

(10) Patent No.: US 8,489,545 B2
(45) Date of Patent: Jul. 16, 2013

(54) SYSTEM AND METHOD FOR CREATING AND MAINTAINING PRE-TASK PLANNING DOCUMENTS

(76) Inventor: Norman Ritchie, Houston, TX (US)

( * ) Notice: Subject to any disclaimer, the term of this patent is extended or adjusted under 35 U.S.C. 154(b) by 141 days.

(21) Appl. No.: 12/661,512

(22) Filed: Mar. 18, 2010

(65) Prior Publication Data

US 2010/0257213 A1 Oct. 7, 2010

Related U.S. Application Data

(60) Provisional application No. 61/161,191, filed on Mar. 18, 2009.

(51) Int. Cl.
*G06F 17/30* (2006.01)

(52) U.S. Cl.
USPC ........... 707/608; 707/769; 707/825; 705/7.28

(58) Field of Classification Search
USPC ............. 707/758, 822, 999.01, 999.107, 608, 707/825, 769; 705/7.12, 7.13, 7.23, 7.27, 705/7.28
See application file for complete search history.

(56) References Cited

U.S. PATENT DOCUMENTS

| | | | | |
|---|---|---|---|---|
| 5,726,884 A | * | 3/1998 | Sturgeon et al. | 705/7.12 |
| 5,752,054 A | * | 5/1998 | Garber et al. | 715/205 |
| 5,774,449 A | * | 6/1998 | Czachowski et al. | 702/182 |
| 6,097,995 A | * | 8/2000 | Tipton et al. | 700/266 |
| 6,161,101 A | * | 12/2000 | Guinta et al. | 706/45 |
| 6,397,115 B1 | * | 5/2002 | Basden | 700/83 |
| 6,826,539 B2 | * | 11/2004 | Loveland | 705/4 |
| 7,441,197 B2 | * | 10/2008 | Tschiegg et al. | 715/741 |
| 7,448,046 B2 | * | 11/2008 | Navani et al. | 719/316 |
| 7,496,580 B2 | * | 2/2009 | Hajdukiewicz et al. | 1/1 |
| 7,684,966 B1 | * | 3/2010 | Genovese | 703/6 |
| 7,716,239 B2 | * | 5/2010 | Murez et al. | 707/779 |
| 7,725,565 B2 | * | 5/2010 | Li et al. | 709/219 |
| 7,850,912 B2 | * | 12/2010 | Favuzzi et al. | 422/63 |
| 7,877,686 B2 | * | 1/2011 | Abbott et al. | 715/712 |
| 7,960,178 B2 | * | 6/2011 | Key et al. | 436/43 |
| 7,987,017 B2 | * | 7/2011 | Buzzoni et al. | 700/213 |
| 2005/0181337 A1 | | 8/2005 | Shaw | |
| 2007/0288159 A1 | * | 12/2007 | Skelton | 701/207 |

OTHER PUBLICATIONS

Brush et al., Preventing Your Next Environmental Incident, Jul. 2007, Air & Waste Management Association, pp. 7-13.*

* cited by examiner

*Primary Examiner* — Leslie Wong

(57) ABSTRACT

An automated pre task planning document library system for creating, maintaining, processing, storing, and delivering arranged pre task planning documents suitable for identifying assignments that may mitigate harm from identified hazards associated with task elements that may be performed in the completion of a task.

6 Claims, 48 Drawing Sheets

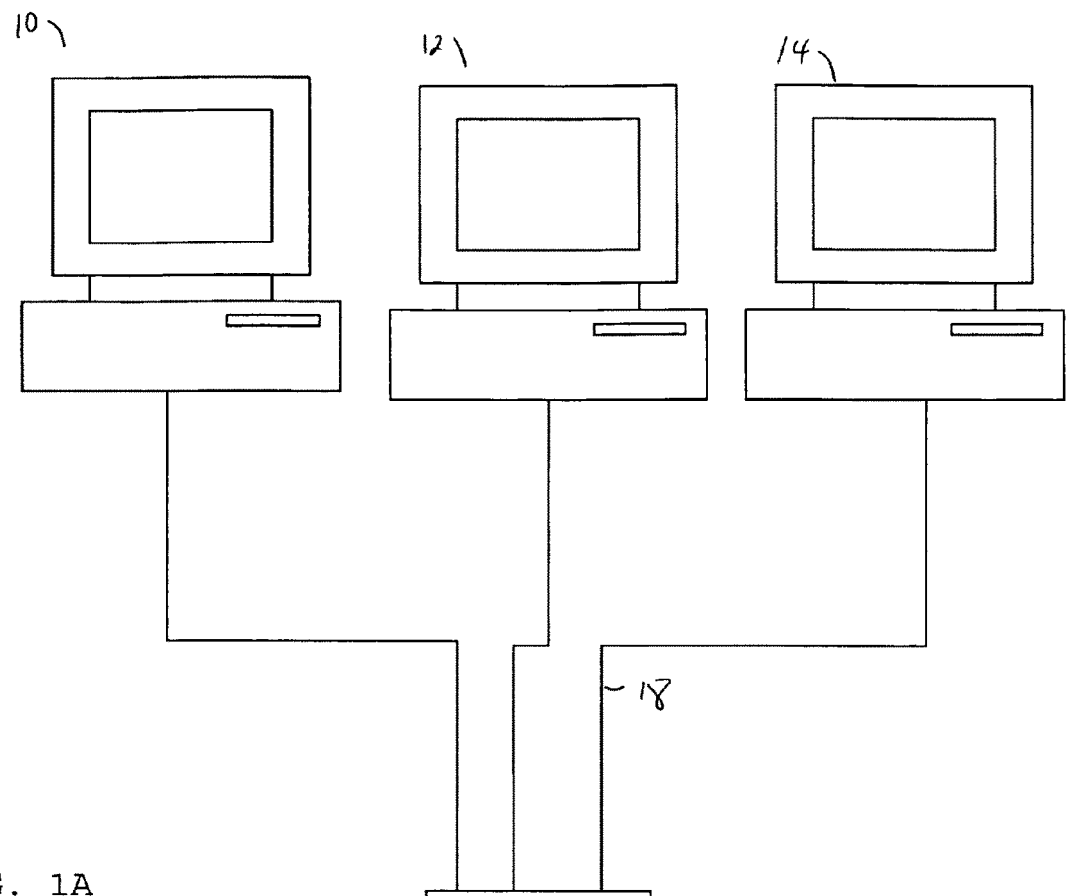
FIG. 1A
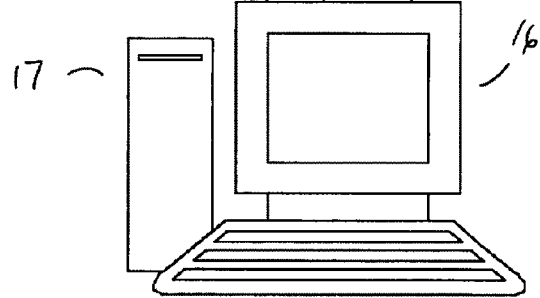
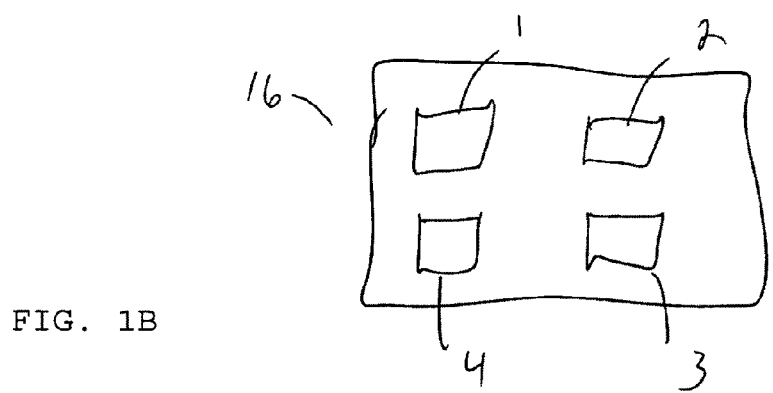
FIG. 1B

Fig. 43
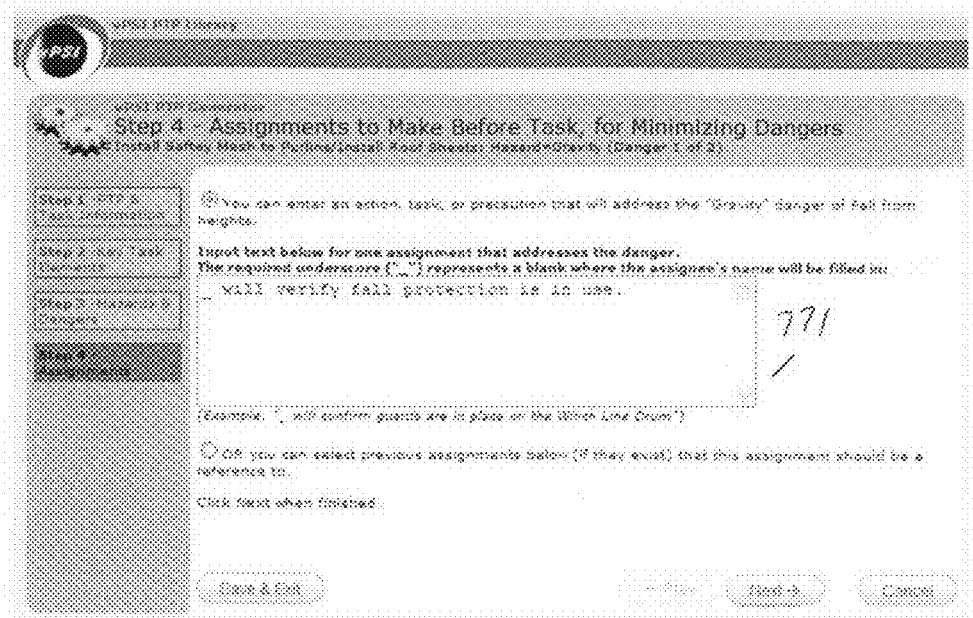
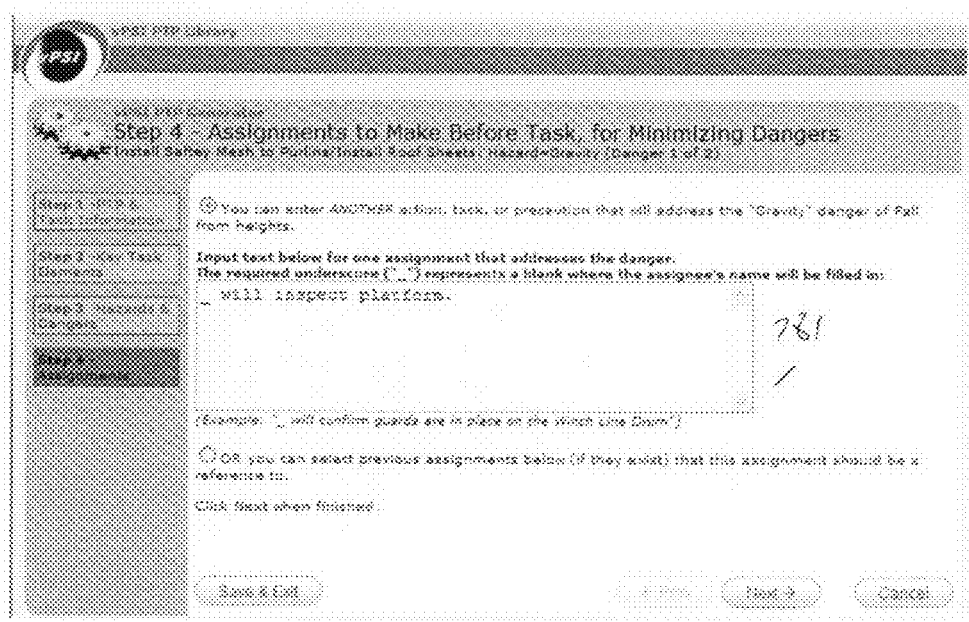
Fig. 44

FOR EACH PTP DOCUMENT: Information

| PTP DOC INFO | DESCRPITION |
|---|---|
| PTPDocID | Identifies the document |
| CreatedBy | Identifies the author |
| Created | Date document created |
| Revised BY | Identifies reviser of doc |
| Revised | Date Revised |
| Organization | Library or organization who owns the document |
| Document Status | Status of the document |
| Job | Name or description of the task or job associated with the PTP Doc |
| Environment | Environment in which the Job takes place |
| EquipmentReq | Description if any of emergency or non-standard equipment that may be required. |
| Permits | Description of any work permits that may be required if any |

FIG 57A

FOR EACH PTP DOC: Key Task Elements

| PTPDocID | PTP Document for which this Task element is associated |
|---|---|
| Task | Description of the task element |
| TaskID | Identifies the task element |

Fig. 57B

For each Key Task Element: Hazard and/or Danger

| TaskID | Identifies the task element |
|---|---|
| Hazard/Danger | Describes the Hazard and/or Danger |
| HDID | Identifies this particular Hazard and/or Danger |

Fig. 57C

FOR EACH HAZARD AND/OR DANGER: Assignments

| HDID | Identifies the particular Hazard and/or Danger |
|---|---|
| AssignmentDescr | Description of the assignment |
| AssignID | Identifies this assignment |

Fig. 57D

FOR EACH PTPDOC: Global Assignments

| PTPDocID | PTP Document for which this global assignment pertains |
|---|---|
| GlobAssign | Description of the Global Assignment |
| GobAssignID | Identifies this Global Assignment |

Fig. 57E

Job Safety Analysis

| Task: | | Date Issued or Revised: | |
|---|---|---|---|
| Company: | Location: | Task Leader: | Date: |

| Non-standard PPE or Emergency Equipment Required: Work Permits Required. | | |
|---|---|---|
| Key Task Elements (Changes in Crews, Activities, Environment) | Hazards (Energy Sources) & Dangers (Potential Exposure to These Hazards) | Assignments to Make Before Task, for Minimizing Dangers |
| | | |

FIG. 98

COMPANY NAME
Job Hazard Analysis

| COMPANY LOGO | | | | |
|---|---|---|---|---|
| JHA#: | Work Activity: | | Area/Unit: | Document Last Revised: |
| JHA Leader: | Foreman: | | Approved By: | |
| Applicable SWIs: | | | | |
| PPE: ☐ Hard Hat ☐ Nomex ☐ Safety Glasses ☐ Hearing Protection ☐ Fall Protection ☐ Safety Goggles ☐ Face Shield ☐ Safety Shoes ☐ Respiratory Protection ☐ Gloves ☐ Chemical Protective Clothing ☐ Thermal Protection ☐ Other: | | | Permits Required: Yes | |
| Key Job Elements | Hazard (Energy Source) and Dangers (Potential Harm) | | Assignments to minimum exposure | |
| | | | | |

FIG. 59

SYSTEM AND METHOD FOR CREATING AND MAINTAINING PRE-TASK PLANNING DOCUMENTS

CROSS REFERENCE TO RELATED APPLICATIONS

This application claims the benefit of U.S. Provisional Application No. 61/161,191, filed on Mar. 18, 2009.

BACKGROUND

The present invention relates, generally, to a network based system for creating and maintaining pre-task planning (PTP) documents according to a hazards groups approach. The system enables the creation and maintenance of a library of pre task planning documents where users may create new PTP documents, modify existing PTP documents, derive new PTP documents from existing PTP documents, identify regularly used PTP documents for later access, share PTP documents with other groups or individuals and obtain PTP documents for use during implementation of the task.

BRIEF DESCRIPTION OF THE DRAWINGS

FIG. 1A depicts a system according to a preferred embodiment.

FIG. 1B depicts a library server according to a preferred embodiment.

FIGS. 10 through 55 depict dialogs for creating PTP documents according to preferred embodiments.

FIGS. 57A-E illustrate information data fields that can be described and kept in a database according to an embodiment of the invention.

FIGS. 58-59 illustrate templates that can be populated with information related to PTP documents according to the invention.

DETAIL DESCRIPTION OF THE PREFERRED EMBODIMENTS

Figure 2:
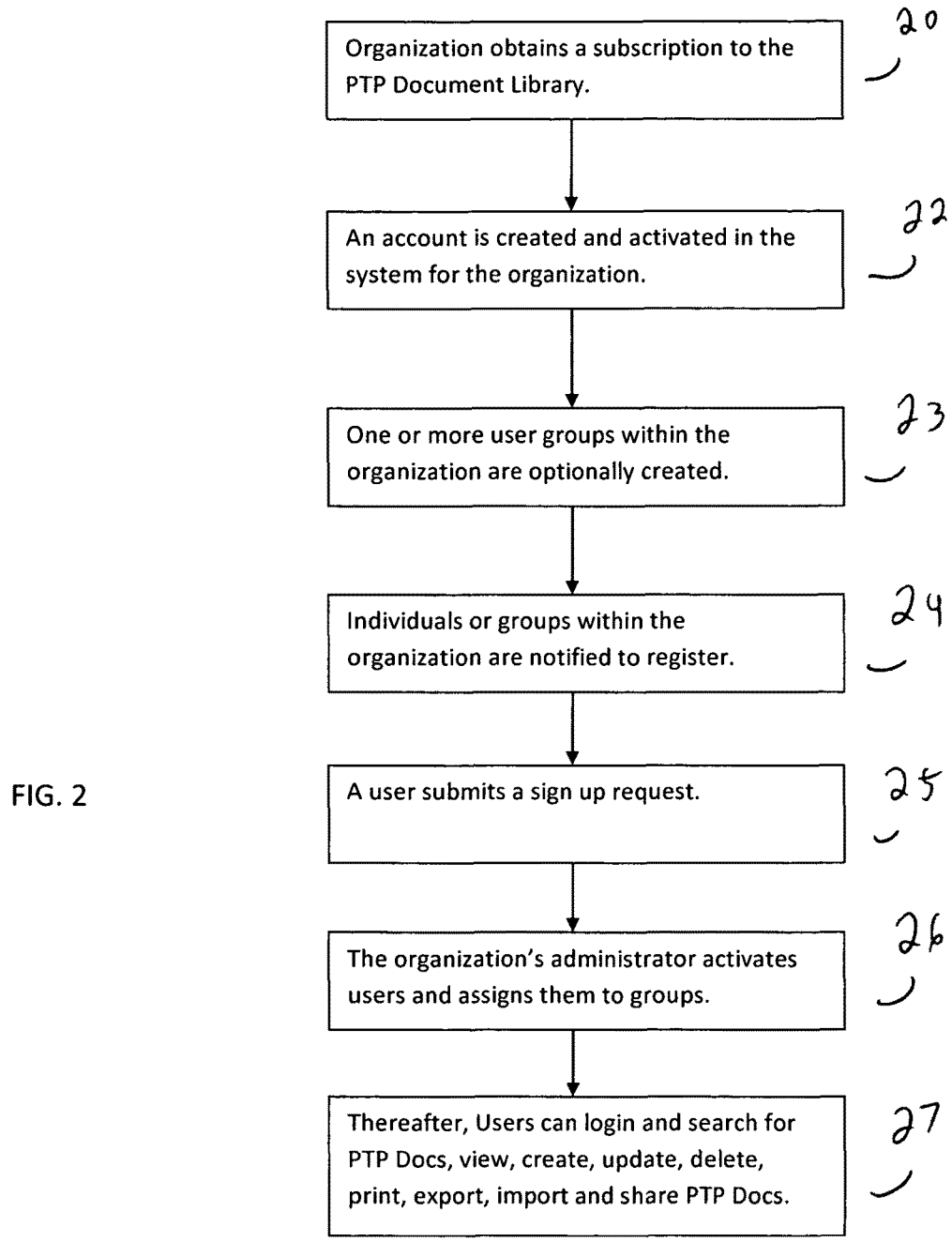
FIG. 2 is a flow chart describing the process of creating user accounts.

FIG. 1A depicts an internetwork of computers 10, 12, 14, and 16 according to a preferred embodiment of the invention. A PTP document library server 16 having a data storage system 17 receives requests from one or more client stations 10, 12, and 14 over a network 18. FIG. 1B shows a diagram of a preferred embodiment of library server 16 having a communications module 1, processing module 2, memory module 3, and data bus module 4. Communications module 1 is configured and operable for receiving and transmitting information over a network such as an ethernet network, a wireless network, direct connection, or any other type of information network. In a preferred embodiment library 16 can communicate with data storage system 17 through communications module 1. Processing module 2 is operable and configured to process information according to the embodiments of the invention using computer instructions that describe the operations to be applied to the information according to the embodiments of the invention. Memory module 3 is a memory module such as a Random Access Memory that is used by processing module 2 to store information and instructions including receiving information from data storage system 17. Data bus module 4 may also be used in another preferred embodiment of the invention to communicate with a data storage system 17 that is connected directly to library server 17 such as by an external or internal data storage system. Although network 18 is depicted with a separate line from a client station to the server 16, this should not be construed as requiring a hard line or direct connection for each client station. The system is operable over any type of computer network that enables computers to communicate with each other. The number of client stations depicted in the FIG. 1 should not be construed as a limitation, but is rather illustrative of one or more client stations in communication with a library server. Network 18 may be the Internet, a local area network, a company intranet, or any other type of network including a wide area network that enables the client stations 10, 12, and 14 to communicate with the PTP document library server 16. The library server 16 enables different levels of user access depending upon the type of user being serviced. In a preferred embodiment, library server 16 maintains an open level of access, preferably called the open library. Library server 16 also enables organizations to maintain their own volume of PTP documents in a restricted library that is not available to the open access users but is limited to those users to whom the organization authorizes. In a preferred embodiment, users within an organization's private library may contribute PTP documents to the open access library or make private PTP documents available to be accessible in the open access library.

FIG. 2 shows a procedure for setting up a PTP document library for an organization according to a preferred embodiment. In step 20 the organization obtains a subscription to the PTP document library. On the library server, an account is created and activated in the system for the organization as set forth in step 22. Optionally, one or more user groups within the organization are created as set forth in step 23. Next, according to step 24 individuals or groups within the organization are notified to register with the library server. In step 25, a user submits a sign up request which the organization's administrator activates and optionally assigns to a group as set forth in step 26. In step 27, users can log in and search for PTP documents, view, create, update, delete, print, export, import and share PTP documents within the organization's library.

Figure 3A:
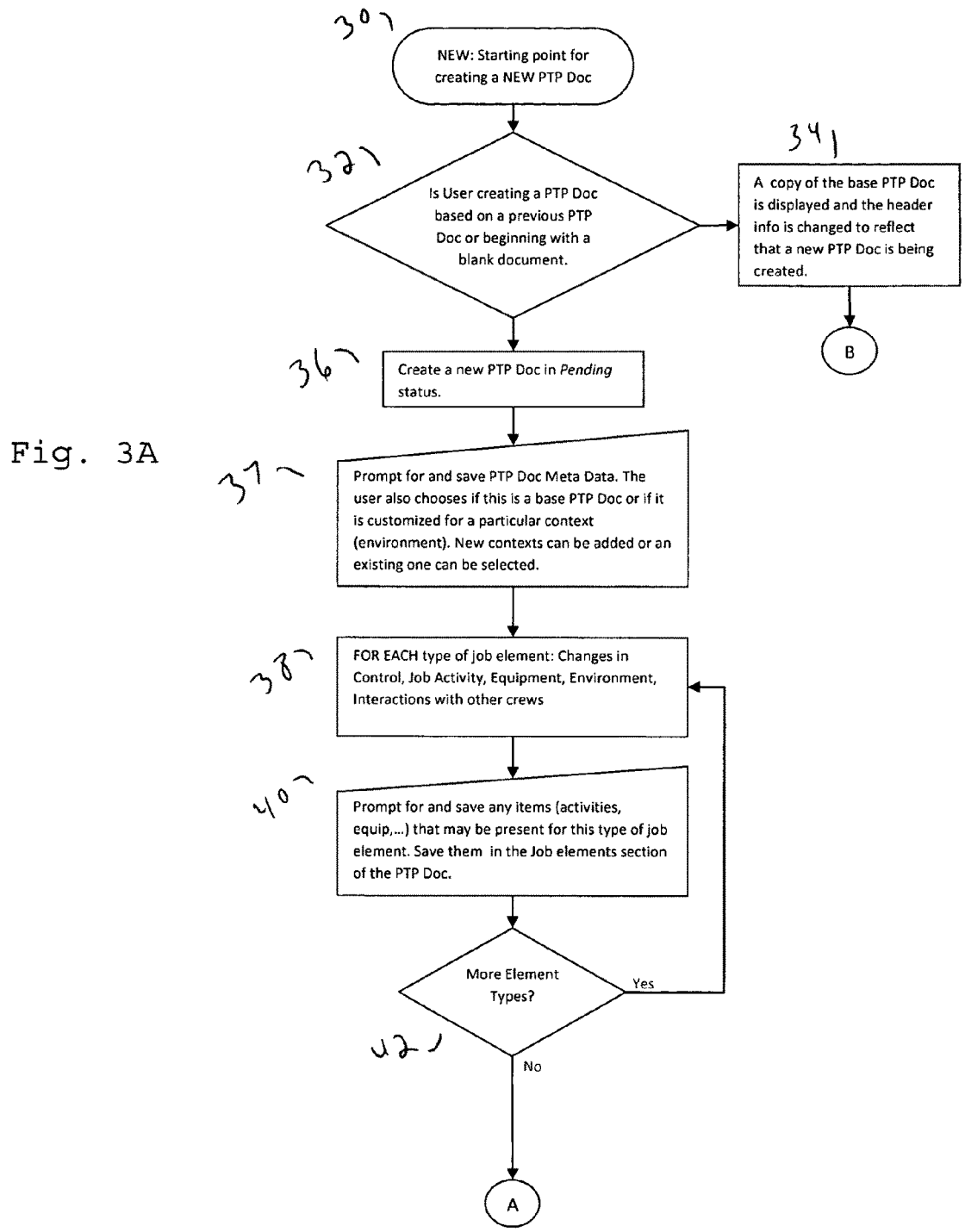
FIGS. 3A-3C is a flow chart describing a process of creating PTP documents according to a preferred embodiment.
Figure 3B:
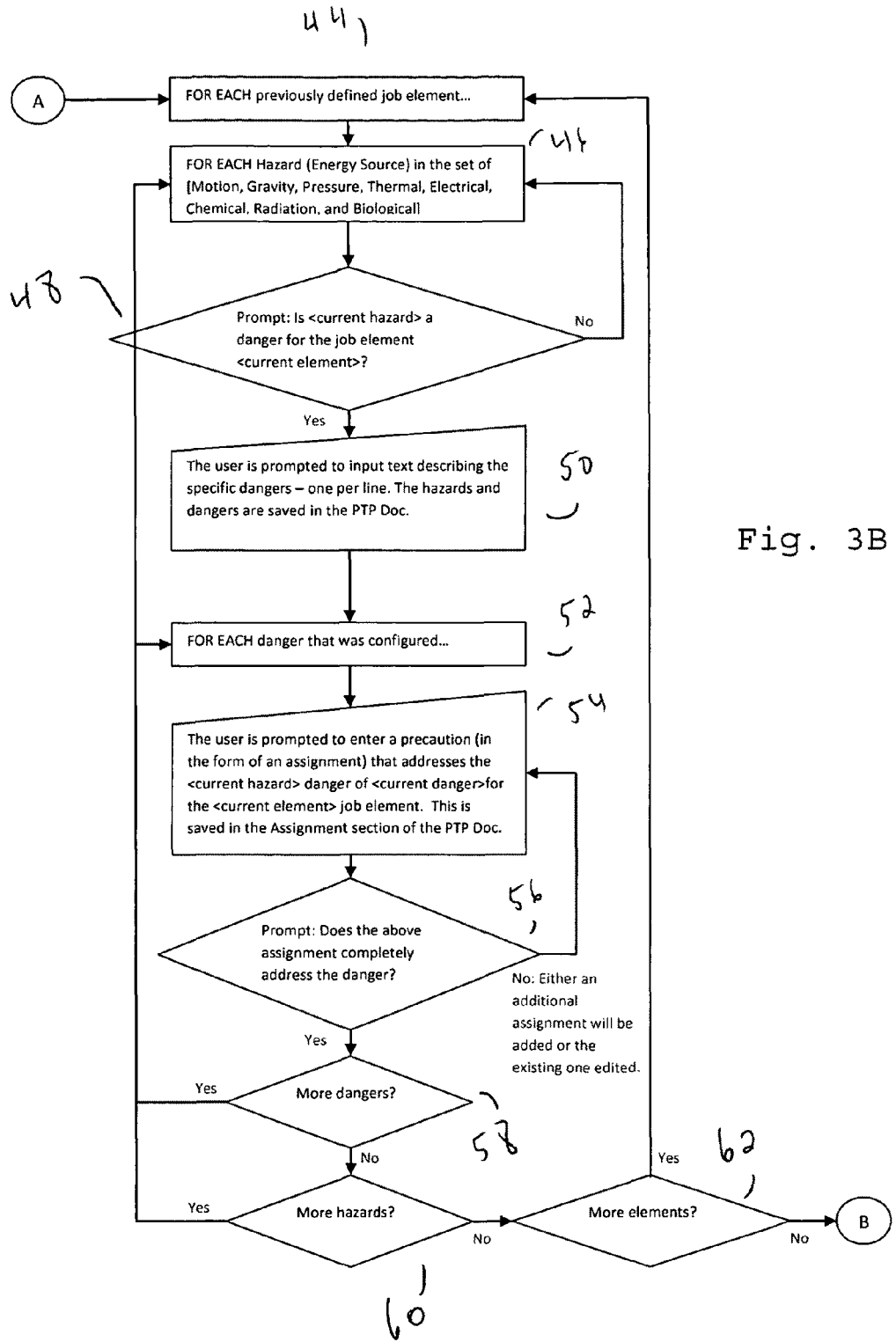
Figure 3C:
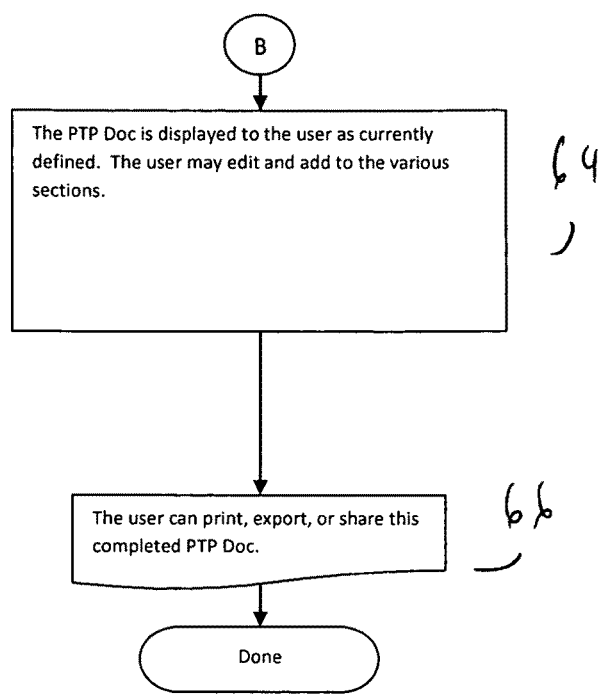
Figure 4:
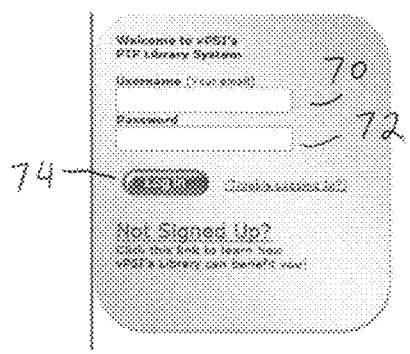
FIG. 4 is a depiction of a login screen according to a preferred embodiment.
Figure 5:
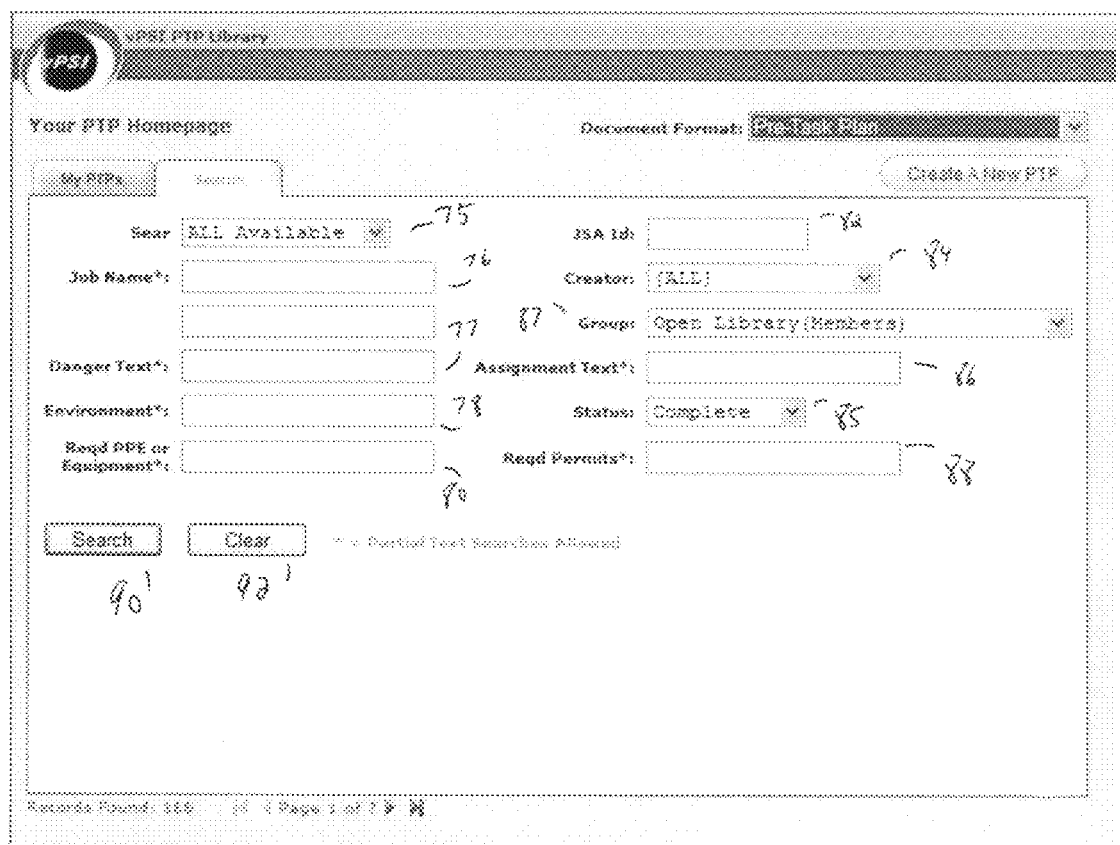
FIG. 5 depicts a dialog box for searching PTP documents according to a preferred embodiment.

FIGS. 3A, 3B, and 3C show a process according to a preferred embodiment for creating PTP documents. FIG. 4 is a depiction of a login input dialog according to a preferred embodiment wherein the user inputs her username and to text input box 70 and her password into text input box 72 and indicates a desire to log on to the library server by depressing the login button 74. The user information is transmitted to library server 16 over network 18. Library server 16 accesses its user information stored in data storage system 17. In a preferred embodiment, data storage system 17 contains a relational database manager which has access to a relational database. An example of such a database manager is Microsoft™ SQL Server 2005. Library 16 determines whether the received information matches the information stored in data storage system 17 and if it does, library server 16 enables a session for the user. FIG. 5 is a depiction of an initial input search dialog that enables a user to search for PTP documents according to predefined criteria. In particular, input box 76 enables the search for PTP documents by Job Name. Input box 77 enables the user to search PTP documents according to the text contained in a description of any danger listed in the PTP document. Input box 78 enables a user to search for specific text used to describe the environment in the PTP document. Input box 80 enables the user to search the text of any required equipment identified by a PTP document. Input box 82 enables a user to search PTP documents by an Id. Input box 84 enables the user to search for all PTP documents created by an individual user. Input box 86 enables the user to search PTP documents using the text that defines assignments within the PTP document. Input box 88 enables a user to search PTP documents according to the text that defines any required permits. Input box 87 enables a user to limit the search to a particular group. Input box 85 enables a user to limit a search depending upon the identified status of a PTP document. Upon entering the information, the user indicates her desire to perform the search by depressing search button 90. At that point the search criteria is transmitted to library server 16 which accesses data storage system 17 to perform the search. The input dialog may be cleared of all entries to begin a new search by depressing clear button 92. Input box 75 contains a drop-down list for indicating that the search should be limited to all available PTP documents or to those documents which have been identified by the user as favorites.

Figure 6:
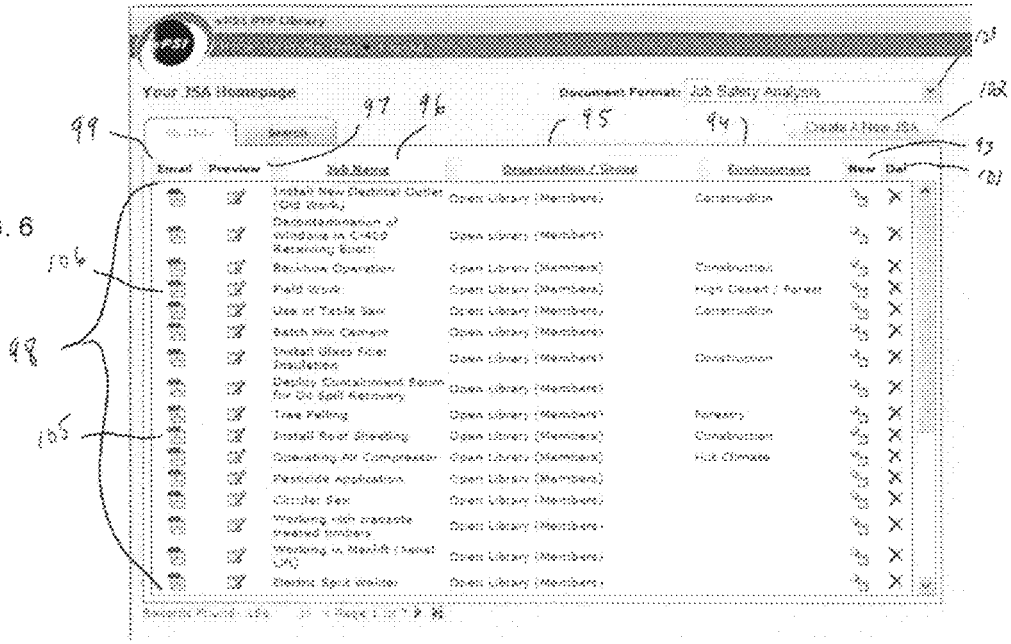
FIG. 6 depicts a dialog box listing available PTP documents according to a preferred embodiment.
Figure 8:
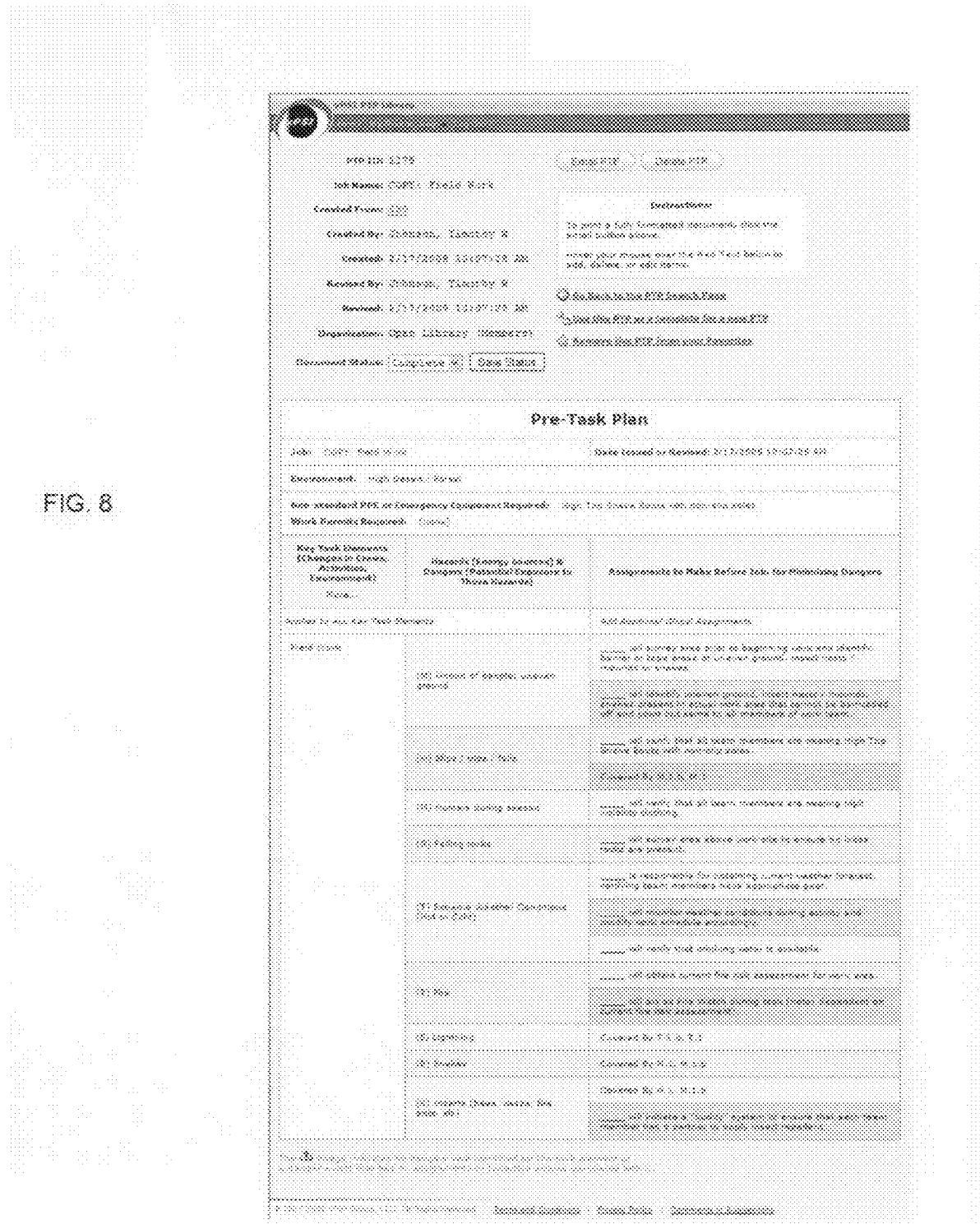
FIG. 8 depicts a preview of a PTP document that used another PTP document as a template.
Figure 9:
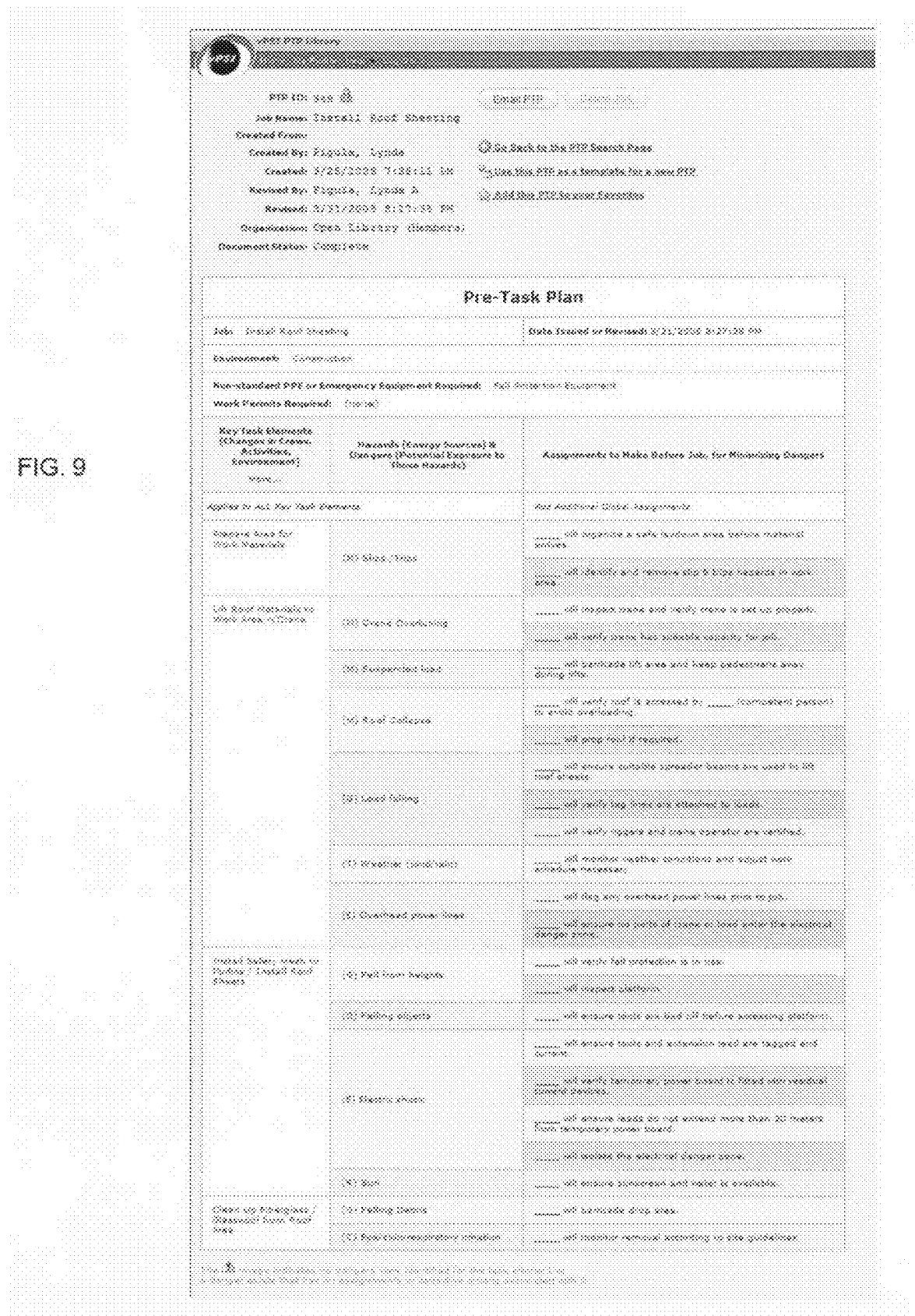
FIG. 9 depicts a preview of a completed PTP document according to a preferred embodiment.

FIG. 6 depicts a results listing dialog box 98 that lists the available PTP documents or the results of a search. For each PTP document listed in box 98, there is a column within each of the rows in box 98 which provides the user with information or enables a user to make a selection. In a preferred embodiment the icons shown in column 99 receive a selection indication from the user that the user is requesting that the PTP document identified by that row be transmitted to the user at the user's predefined e-mail address in a portable document format. Library server 16 accesses the user's information stored in data storage system 17 and obtains the user's preferred email address. Library server 16 creates an email attaching the PTP document selected by the user in a portable document format such as Adobe™ PDF and transmits the email. Alternatively, the user may indicate the document format, such XML, in which the PTP document should be delivered. In a preferred embodiment, the icons shown in column 97 receive a selection indication from the user that the user is requesting that the PTP document identified by that row be presented to the user in a preview mode. Upon selection, the Library server 16 retrieves the identified PTP document from data storage system 17 and previews the PTP document in a preview dialog as shown in FIG. 8 which is a preview of the PTP document identified in row 105. The job name or title is indicated in column 96. The organization or group to which the PTP document belongs is indicated in column 95. The environment to which the PTP document belongs is indicated in column 94. In a preferred embodiment a user may create a new PTP document that is based upon an existing PTP document thereby enabling the user to use a PTP document that is already in the system as a template. The icons depicted in column 93 received a selection indication from the user that the user is requesting that a PTP document identified in that row be used as a basis for a new PTP document. When library server 16 receives the indication from the user by the users clicking or depressing the icon in column 93, the library server 16 retrieves the corresponding PTP document from data storage system 17. The library server 16 then creates a new PTP document and copies the information from the existing PTP document to the data storage for the new PTP document. A new PTP ID is assigned to the newly created PTP document and the word "COPY" is inserted in the job name information for that PTP document. FIG. 8 depicts a PTP document that was created using the PTP document found in row 106 as a template.

In a preferred embodiment library server 16 maintains the following information for each PTP document. The PTP ID which is a unique identifier for that particular PTP document. The Job Name which is the name of the job for which the PTP document is being created. The ID of the PTP document from which the current PTP document is based upon if any. The name of the individual who created the PTP document or any other identification used to identify the creator of the PTP document. The date upon which the PTP document was created. The identity of any individual who has revised the PTP document if any such revision has occurred and the date of any such revision. An indication or identification of the organization to which the PTP document belongs. An indication of the document status such as completed or pending is also maintained by the library server 16 for each PTP document. Additional information as indicated in FIG. 8 may also be maintained in a preferred embodiment.

In a preferred embodiment users have the option of deleting PTP documents that they have created or which they have control over as a member of a group or organization. A user's indication to delete a document is provided by depressing or clicking on the icon shown in column 101 of FIG. 6. Library server 16 receives the indication to delete and determines whether the user has the authority to delete the PTP document. This authority can be determined by looking at any permissions provided to the user with respect to this particular PTP document or whether the user has control over PTP documents that she has created or that are contained within her group. If the library server 16 determines that the user has authority to delete the PTP document then library server 16 communicates with data storage system 17 to delete the identified PTP document.

Figure 7:
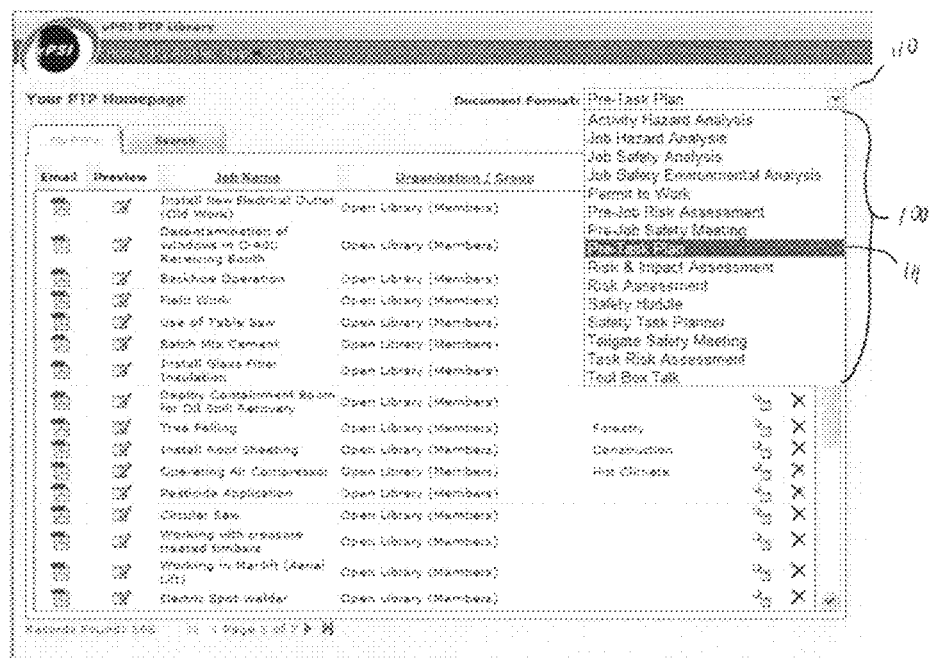
FIG. 7 depicts a dialog box listing available PTP documents and a drop down list box identifying available PTP document types.

In a preferred embodiment, a user has the ability to identify the particular format identification that should be used in preparing PTP documents. Different organizations have different standards and names for PTP documents. To conform to those individual standards, library server 16 enables the user to tailor the system to a particular identified format. As shown in FIG. 7, a drop-down selection box 110 presents the user with a selection of document formats 100. For instance, in FIG. 7 item 111 indicates that the document format and nomenclature to be used is "Pre-Task Plan". Upon receiving the selection, library server 16 maintains the selection as the default document format and naming scheme to be used when presenting information and creating PTP documents. As shown in FIG. 8, the document includes the title "Pre-Task Plan". This ability to select a document format enables the user to use the system and the naming schemes to which the organization has already standardized around thereby enabling the system to more easily integrate in an organization's current safety practices and policies.

A user requests the creation of a new PTP document by depressing and button 102. Upon receiving a request to create a new PTP document, in a preferred embodiment library server 16 determines whether the user has permission to create a new PTP document. If the user has permission to create a new PTP document, library server 16 creates a new data structure to receive information from the user to be used in creating a new PTP document. Preferably, a record in a database maintained by data storage system 17 is created with a unique PTP ID assigned to it. Optionally, library server 16 may create a data structure within its own memory to receive information relating to the newly created a PTP document. Library server 16 creates a new PTP document by presenting to the user questions which elicit specific information from the user which is used to identify Key Elements, Hazards and/or Dangers, Precautions, and Assignments. The task is split into "Key Elements". By considering the task as a whole, rather than reproducing a step-by-step procedure, the system eliminates duplication and enables the PTP document to be more focused. A single Key Element may be used or the library server 16 enables the user to split the Task into key elements related to five categories. For each of the key elements the library 16 will prompt the user as to whether a particular Hazard will present an actual danger for that key element. In the preferred embodiment the Hazards are identified as Motion, Gravity, Pressure, Thermal, Electrical, Chemical, Radiation, and Biological. For each danger associated with each Hazard, library server 16 prompts the user to identify at least one task, action, precaution or preventive action that will be taken to mitigate each of the identified dangers. In a preferred embodiment, these tasks, actions, precautions or preventive actions take the form of assignments. This enables the creation of preventive actions which will address identified Hazards and precautions. Because the PTP document is created prior to the task the assignments are scheduled, linked to the danger and the precaution, and assigned to specific individuals. The library server 16, leaves a space for the name or initials of the individual assigned to carry out the assignment making the effectiveness of the PTP document the responsibility of the user.

Figure 10:
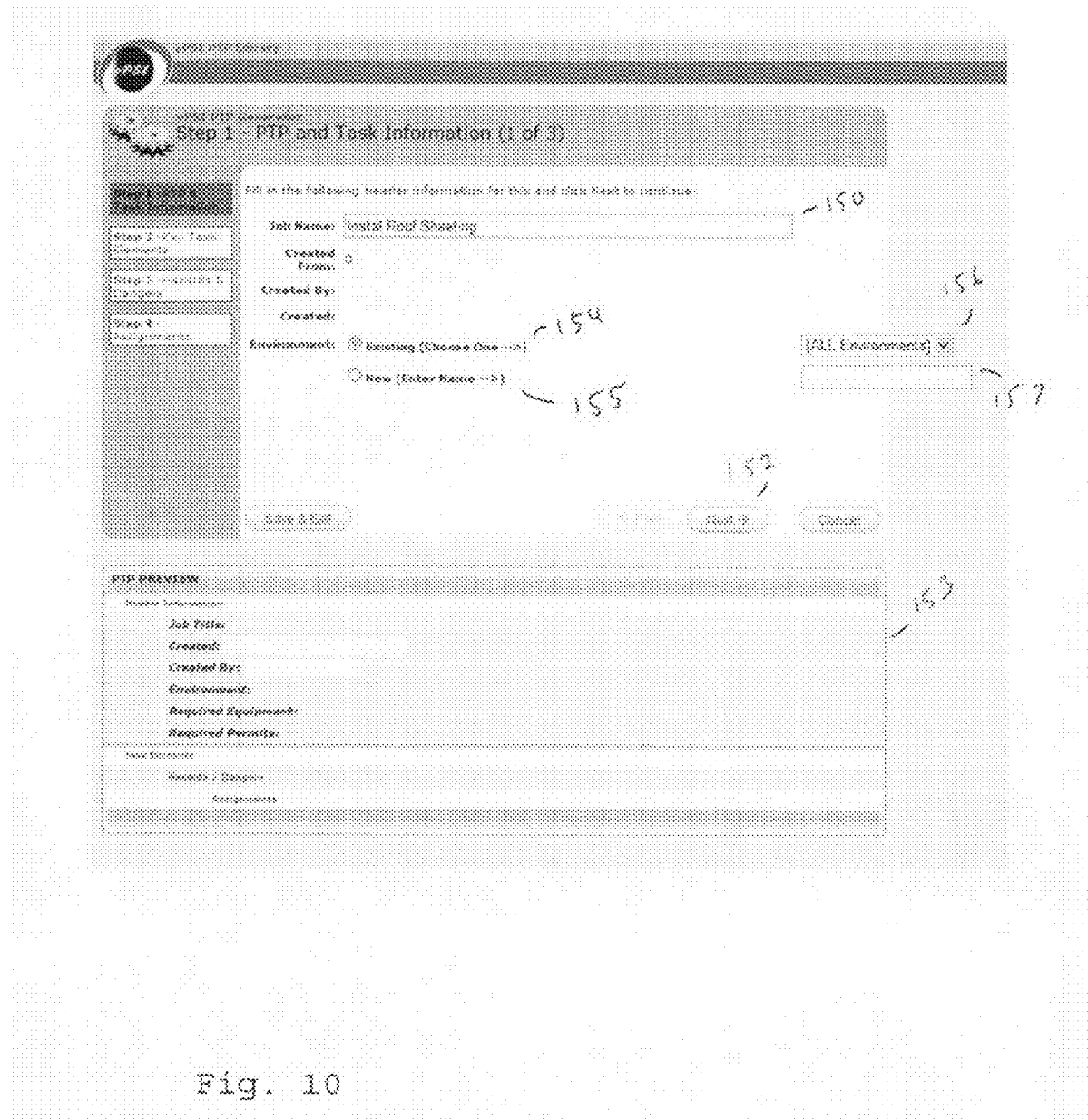
Figure 11:
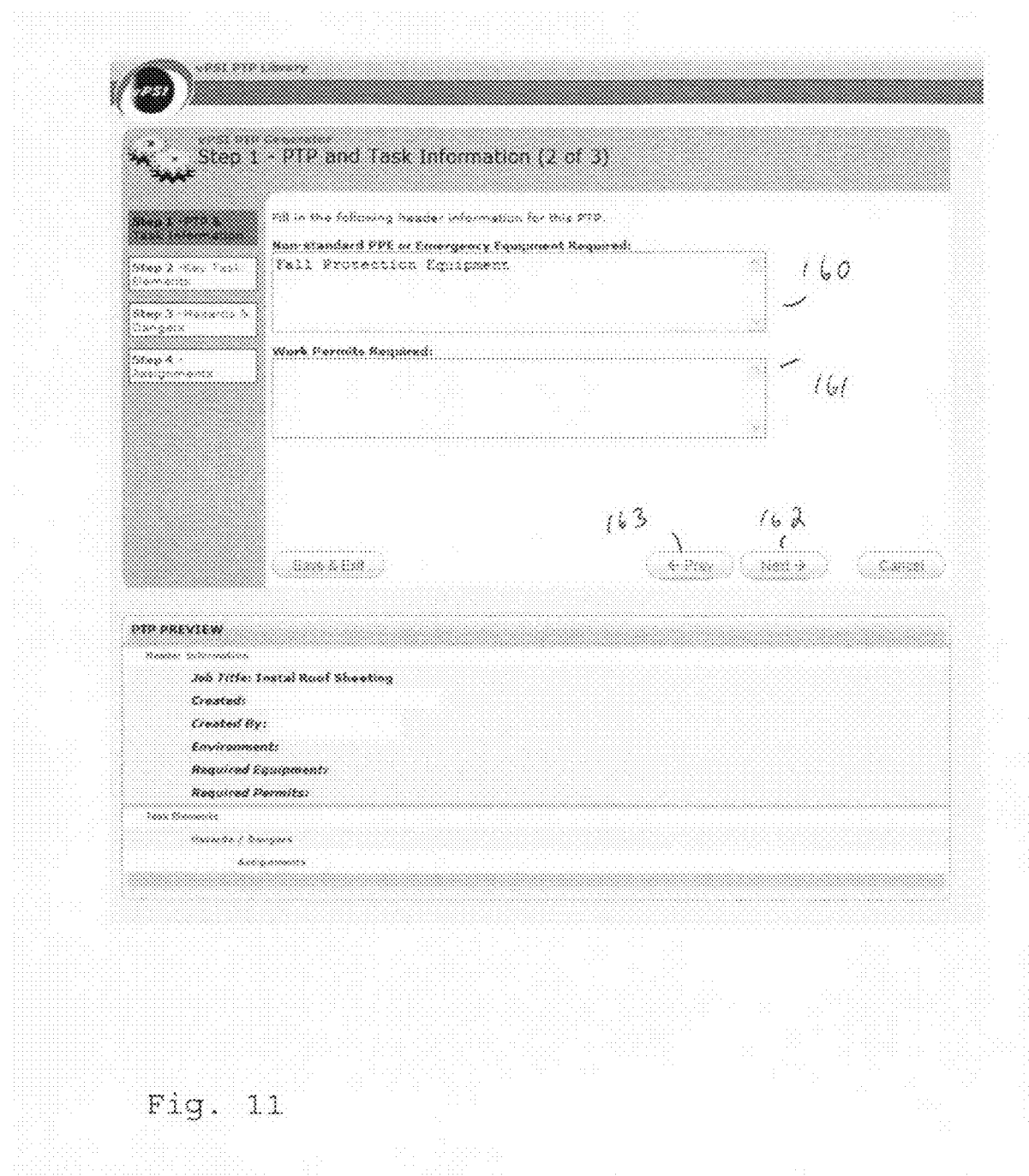

FIGS. 3A-3C depict a process for creating a PTP document according to a preferred embodiment. At step 32, library server 16 determines whether the user intends to create a PTP document that uses an existing PTP document as a template or whether it will be a new PTP document. This determination can be made through the identity of the button or icon depressed by the user. For instance if button 102 is depressed a new PTP document will be created. In step 36, library server 16 creates a new PTP document and gives it a pending status. In step 37, library server 16 presents the user with a dialog box to obtain PTP document information are metadata. FIG. 10 depicts a dialog box according to a preferred embodiment. As shown in FIG. 10, the job name is input by the user into text input box 150. A PTP document preview box 153 is optionally displayed to show the user the progress of input as the system moves through the creation of the PTP document. The user indicates the type of Environment context to which the task is addressed by choosing radio button 154 and identifying an existing environment from list 156 or choosing radio button 155 and entering an environment name in text input box 157. An example of an environment is "construction", however, any environment where a task is being implemented may be used. The user depresses button 152 to indicate to the library server 16 receive the entered information and to continue to the next step. FIG. 11 shows a dialog according to a preferred embodiment which enables the user to input and library server 16 to receive additional information related to the PTP document. In particular, text input box 160 enables the user to identify whether emergency equipment is required. In this example, the user has indicated that "Fall Protection Equipment" will be required for this task. Text box 161 enables the user to indicate whether work permits will be required. The user may move to the next step by depressing button 162 or to the previous step by depressing button 163.

As set forth in steps 38, 40 and 42, the library server 16 prompts the user regarding key task or job elements until all task elements have been received. To assist in defining key task elements, the library server will propound the following general questions:

1. Does control and/or supervision of the task change or pass from one person to another? For example, noon shift change or break time.
2. Are there changes in task activities, stages or steps? For example, batten down the hatches or dive.
3. Are there changes in the equipment being used? For example, new bits deployed every hour.
4. Are there changes in the task environment? For example, 4 p.m. rising tide; 7 p.m. darkness.
5. Are there changes in interaction with other work crews in the vicinity? For example, crane crew gets off.

Figure 24:
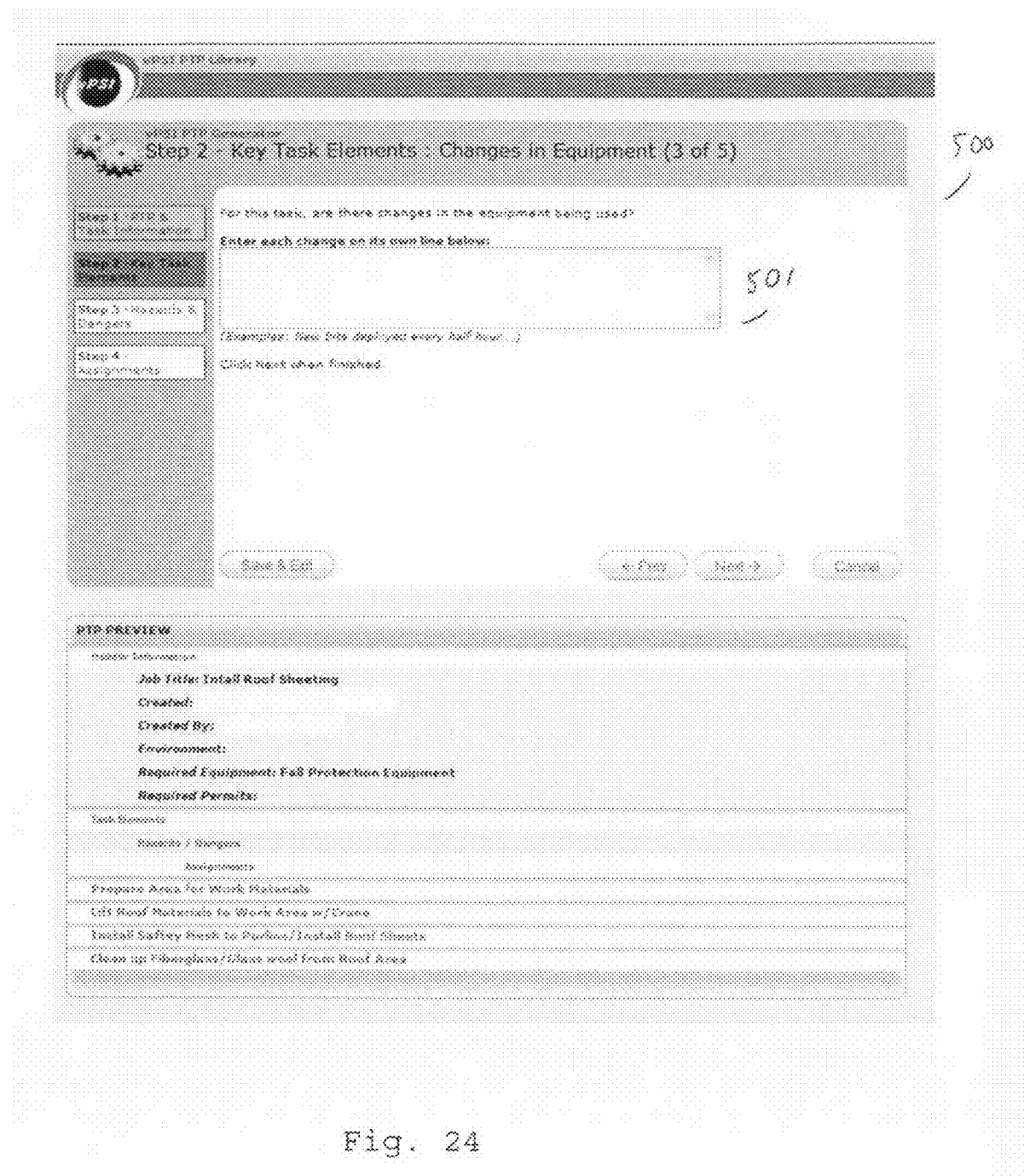
Figure 25:
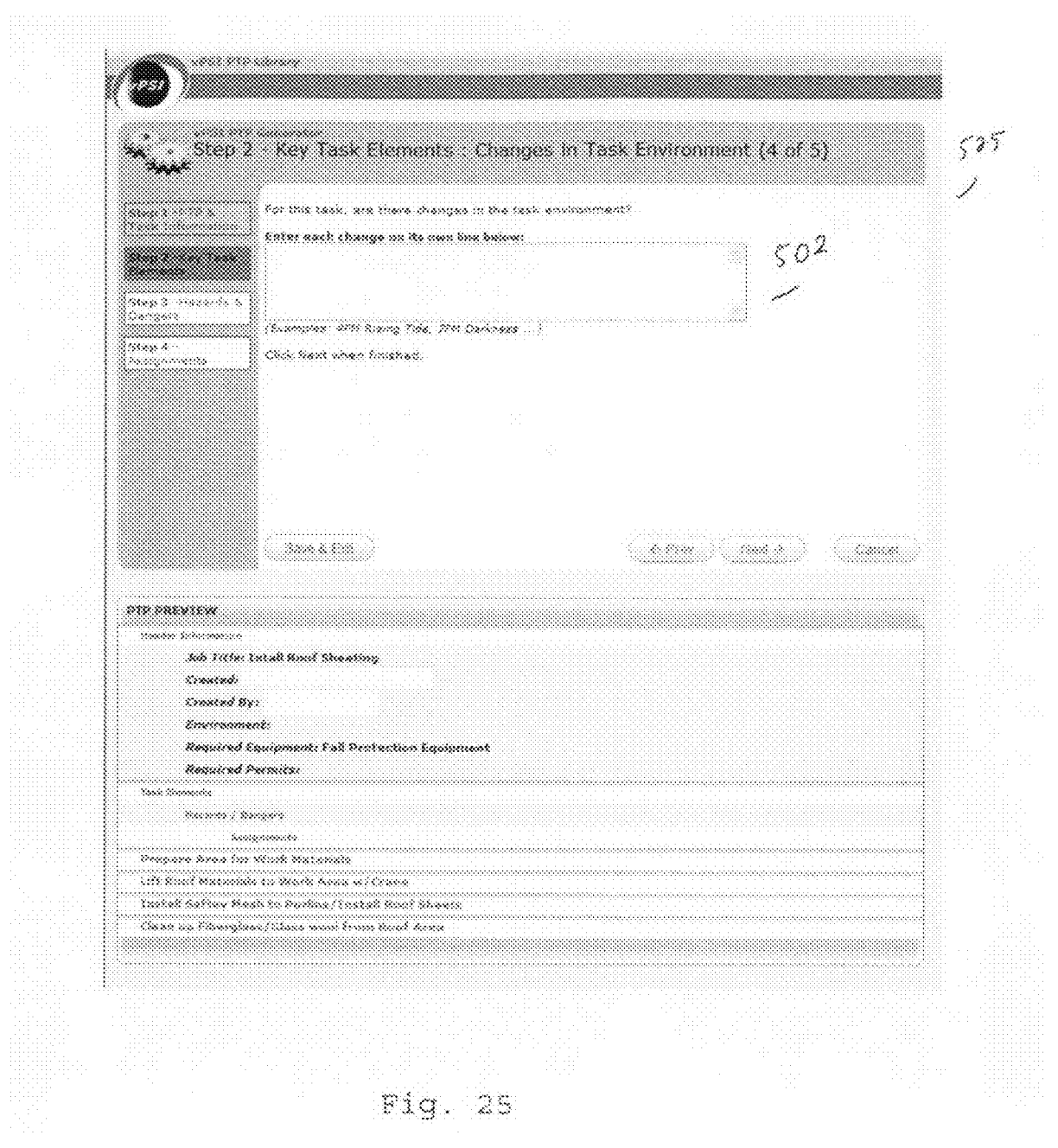
Figure 26:
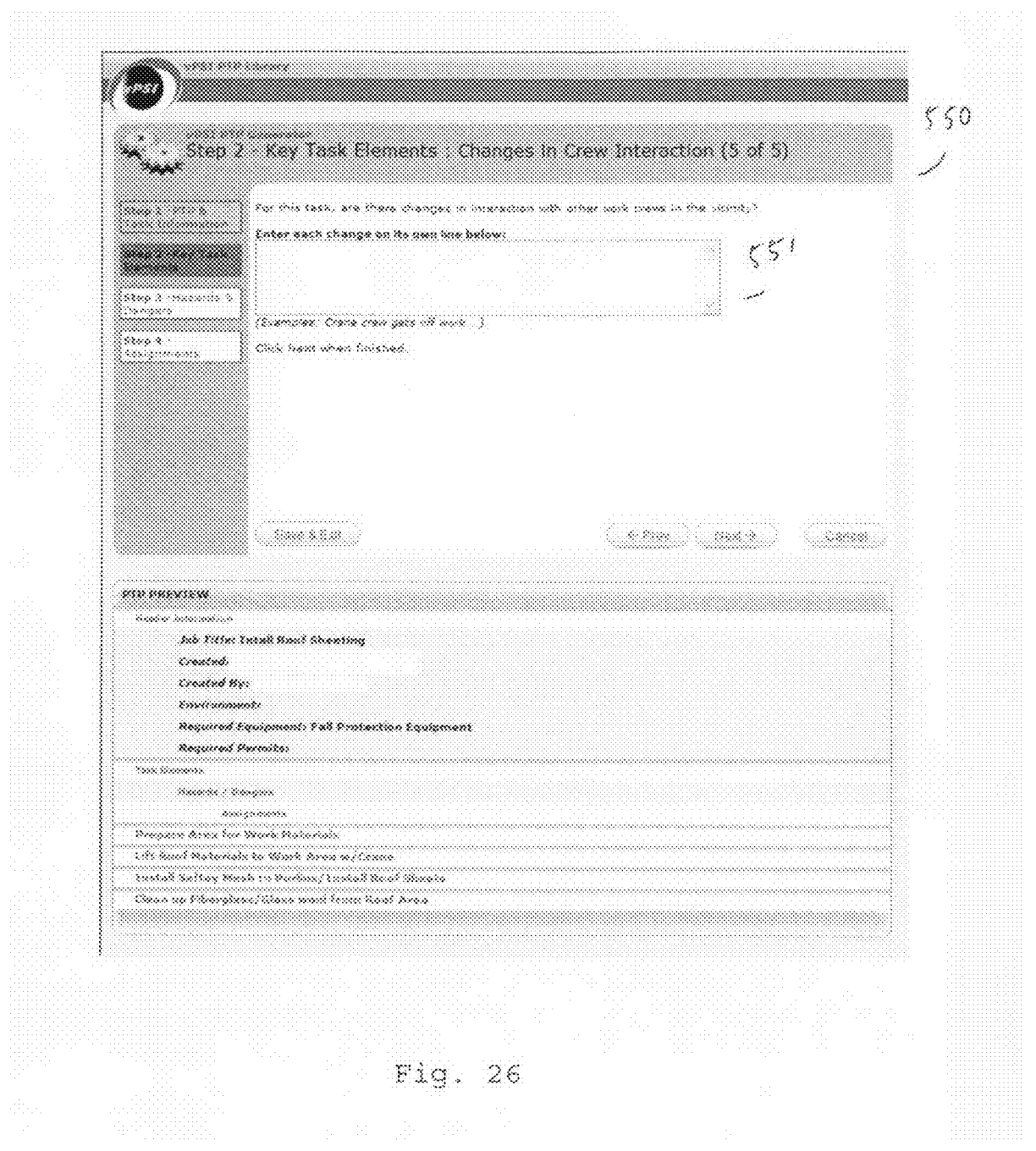

FIGS. 23 through 26 depict dialog input boxes 475, 500, 525, 550, and 575, which present questions intended aid in defining key task elements which need to be addressed to avoid incidents. In dialog 475, the user is presented with the question 476 of "For this task, are there changes in task activities, stages, or steps?". Text input box 477 enables the user to input each change on a separate line as indicated in box 477. If no answer is required then the input box is left empty as shown in FIGS. 24-26 for input boxes 501, 502, and 551. Library server 16 receives the information from the input boxes regarding task elements.

Figure 12:
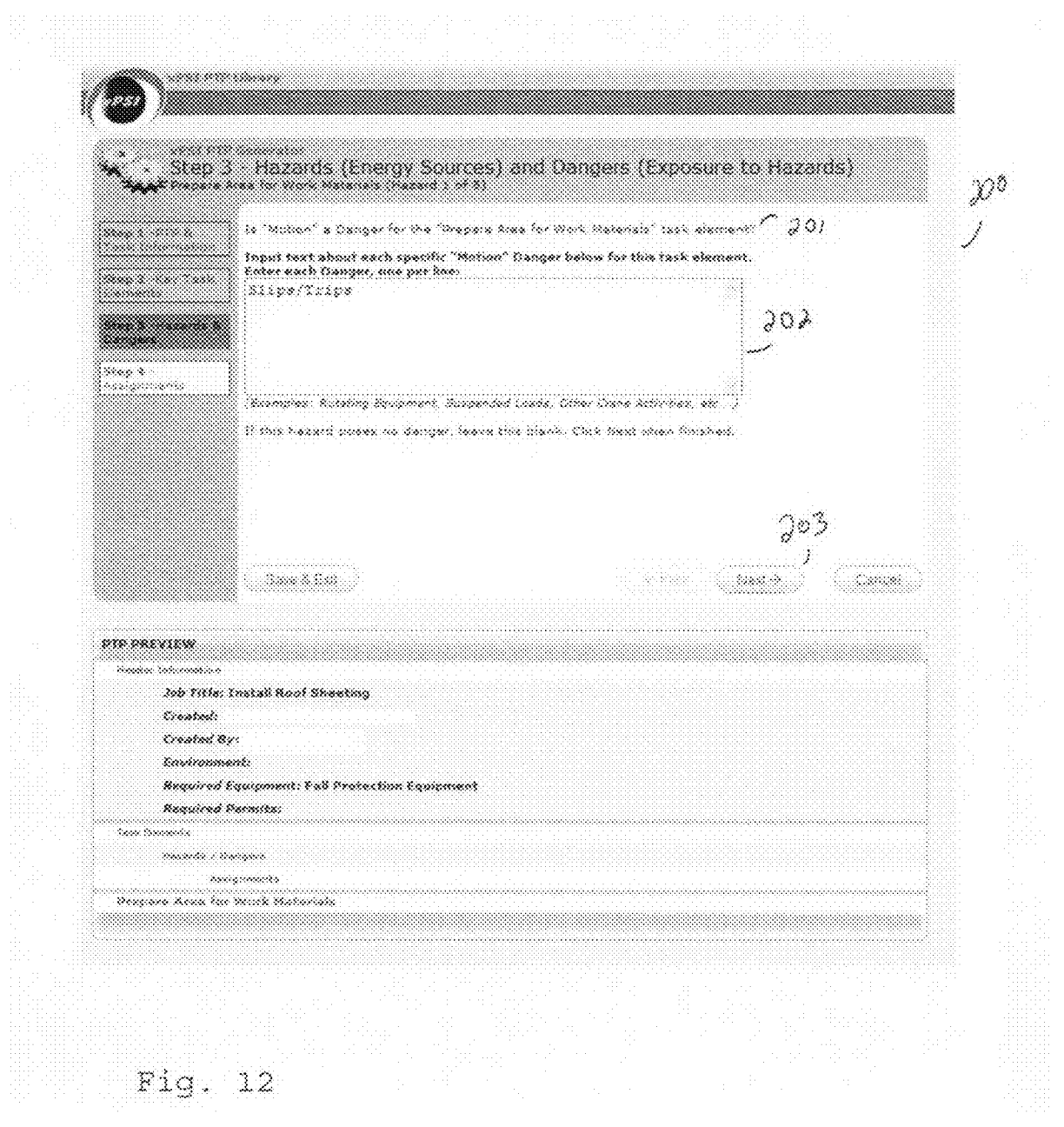
Figure 13:
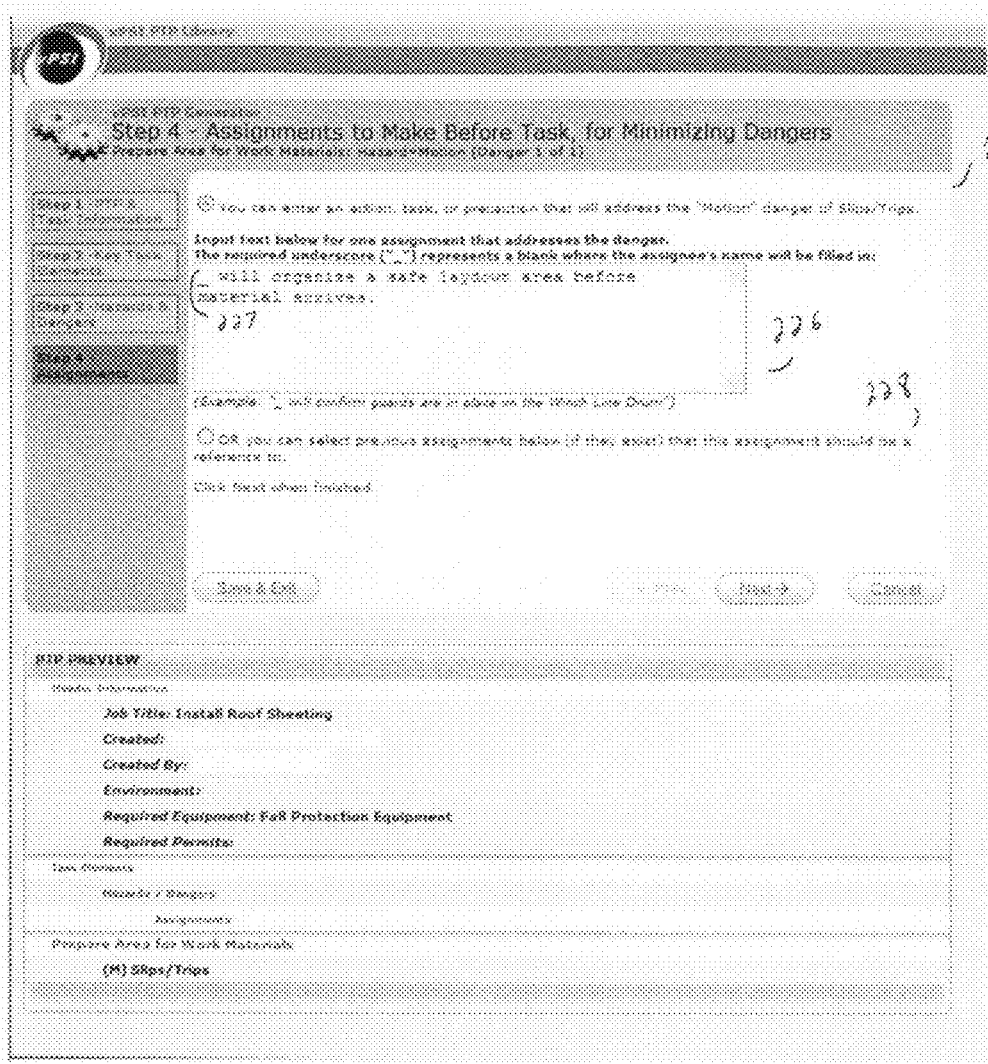
Figure 14:
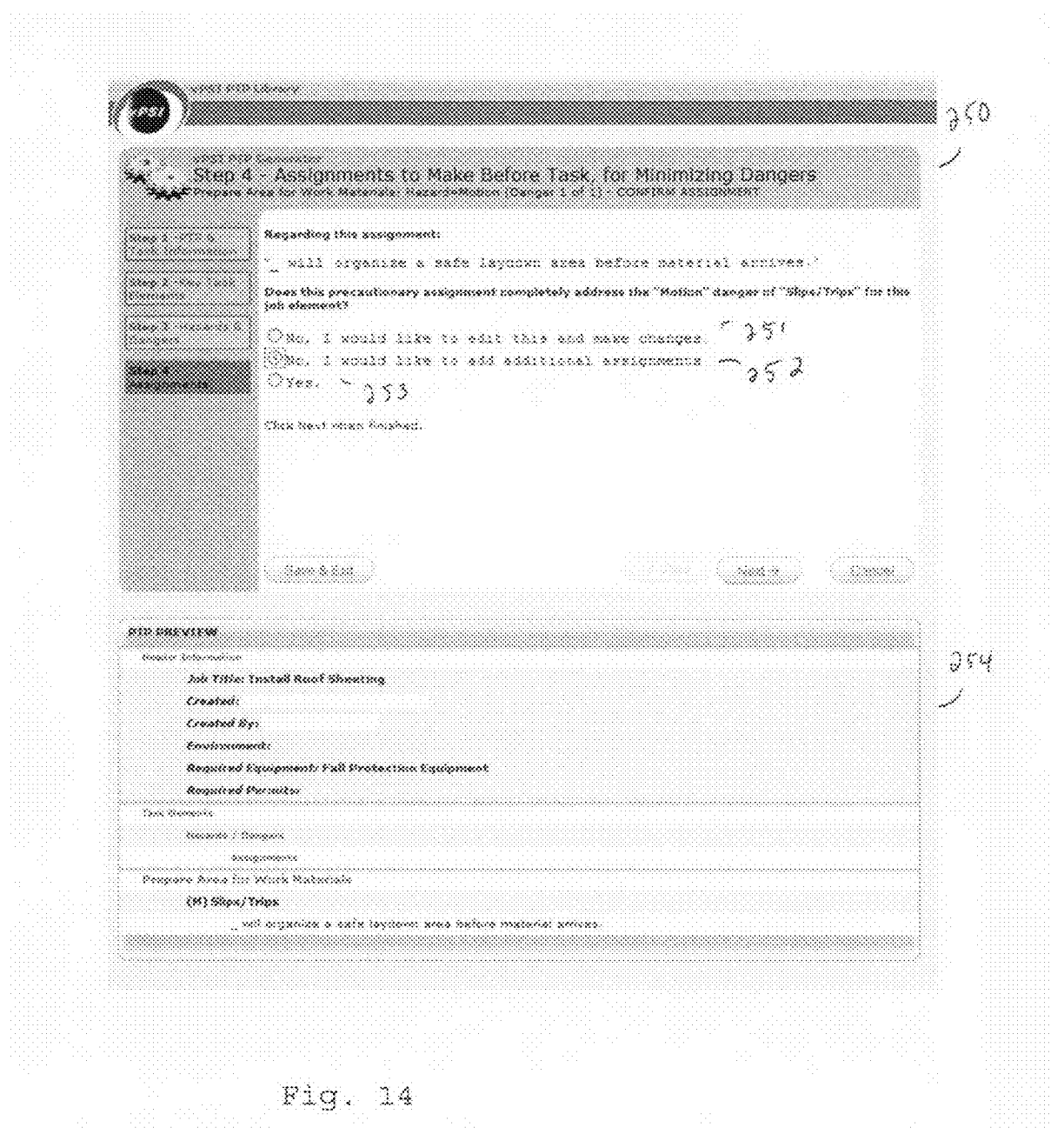
Figure 22:
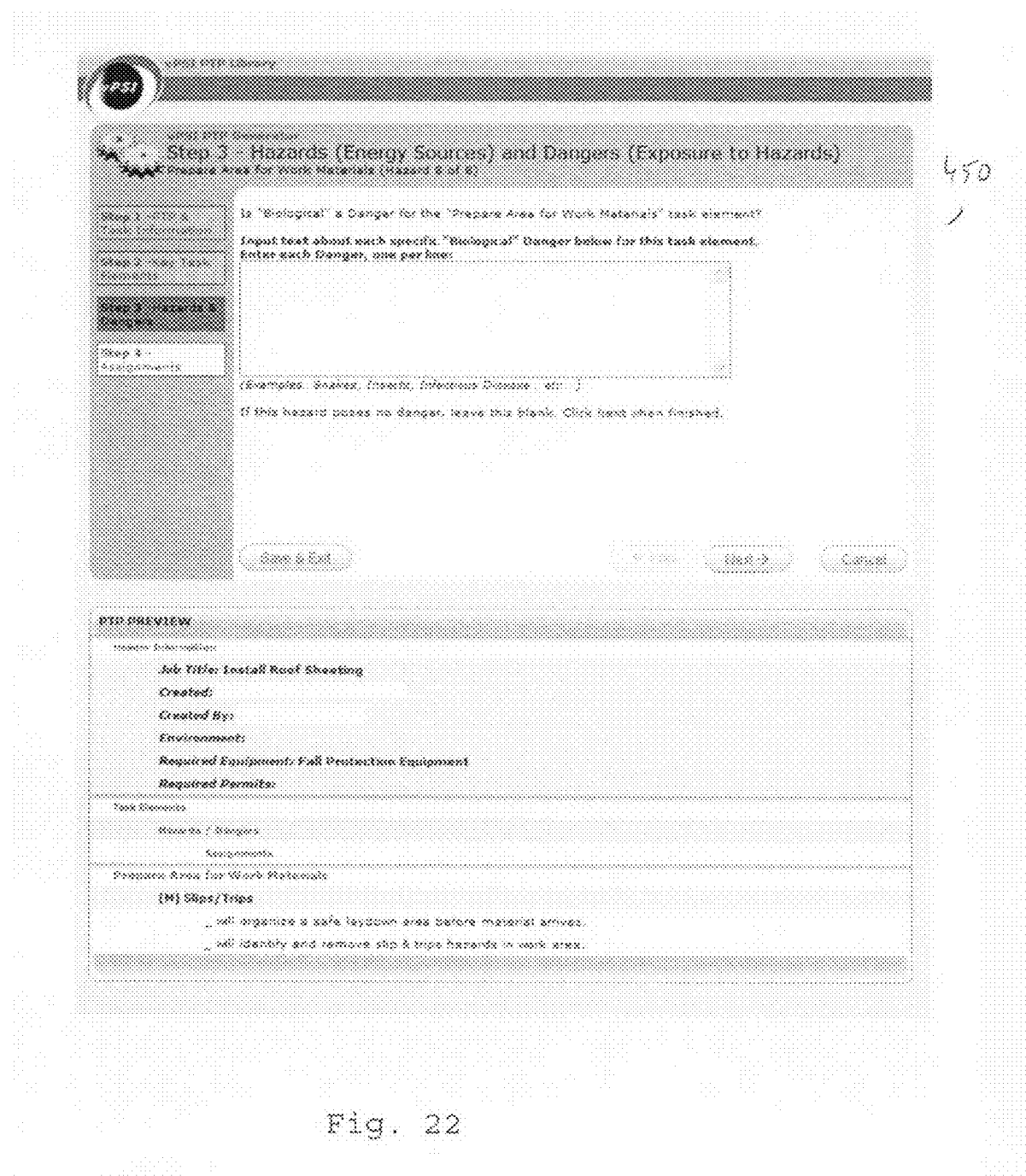

As set forth in step 44, 46 and 48 for each job or task element defined by the user, the library server 16 elicits from the user whether any hazard taken from the group of motion, gravity, pressure, thermal, electrical, chemical, radiation, or biological will pose any danger when completing this job or task element. As set forth in step 50, and illustrated in FIG. 12, library server 16 presents the user with a dialog box 200 which poses the following question 201 "Is "Motion" a Danger for the "Prepare Area for Work Materials" task element?". The user enters each danger that is posed by the hazard of motion into the text input box 202. In box 202, the danger of "Slips/Trips" is identified for the motion hazard. After all dangers for the motion hazard associated with the particular job element have been identified the user is invited to depress a button 203 to transmit the information to the library server 16. Next, for each danger identified, the user is requested, according to step 54, to enter a precaution, action or task, preferably in the form of an assignment for an individual, that will address the hazard danger. As shown in FIG. 13, dialog box 225 requests that the user enter an action, task, or precaution that will address the "Motion" danger of "Slips/Trips" that was identified in box 202. Text input box 226 receives the action, task, or precaution and leaves a blank 227 for the entry of an assignee's name. Alternatively, the user may indicate that a previously entered action, task, or precaution may be used to address this danger as indicated by radio button 228. According to step 50 and as illustrated in FIG. 14 and dialog box 250, the user is requested to indicate whether any other assignments, precautions, tasks or actions are needed to address the current danger. In a preferred embodiment, the user may edit the previous assignment by indicated radio button 251, add additional assignments by indicating radio button 252, or indicate that no further assignments are necessary for the current danger, by indicating radio button 253. Preview 254 is updated to reflect the previously entered assignment along with an indication of the danger and/or hazard. In the preferred embodiment the danger is indicated by using the first letter in a parenthetical which identifies a Hazard, such as (M) for "Motion", (G) for "Gravity", (P) for "Pressure", (T) for "Thermal", (E) for "Electrical", © for "Chemical", (R) for "Radiation" and (B) for "Biological". In a preferred embodiment Hazards can be separated in identified energy sources such as Pressure, Thermal, Electrical, Chemical, Radiation and Biological. For each Hazard there may be one or more dangers which create a potential exposure to those Hazards. For example, slipping or tripping is a danger exposing to hazard of motion.

Figure 15:
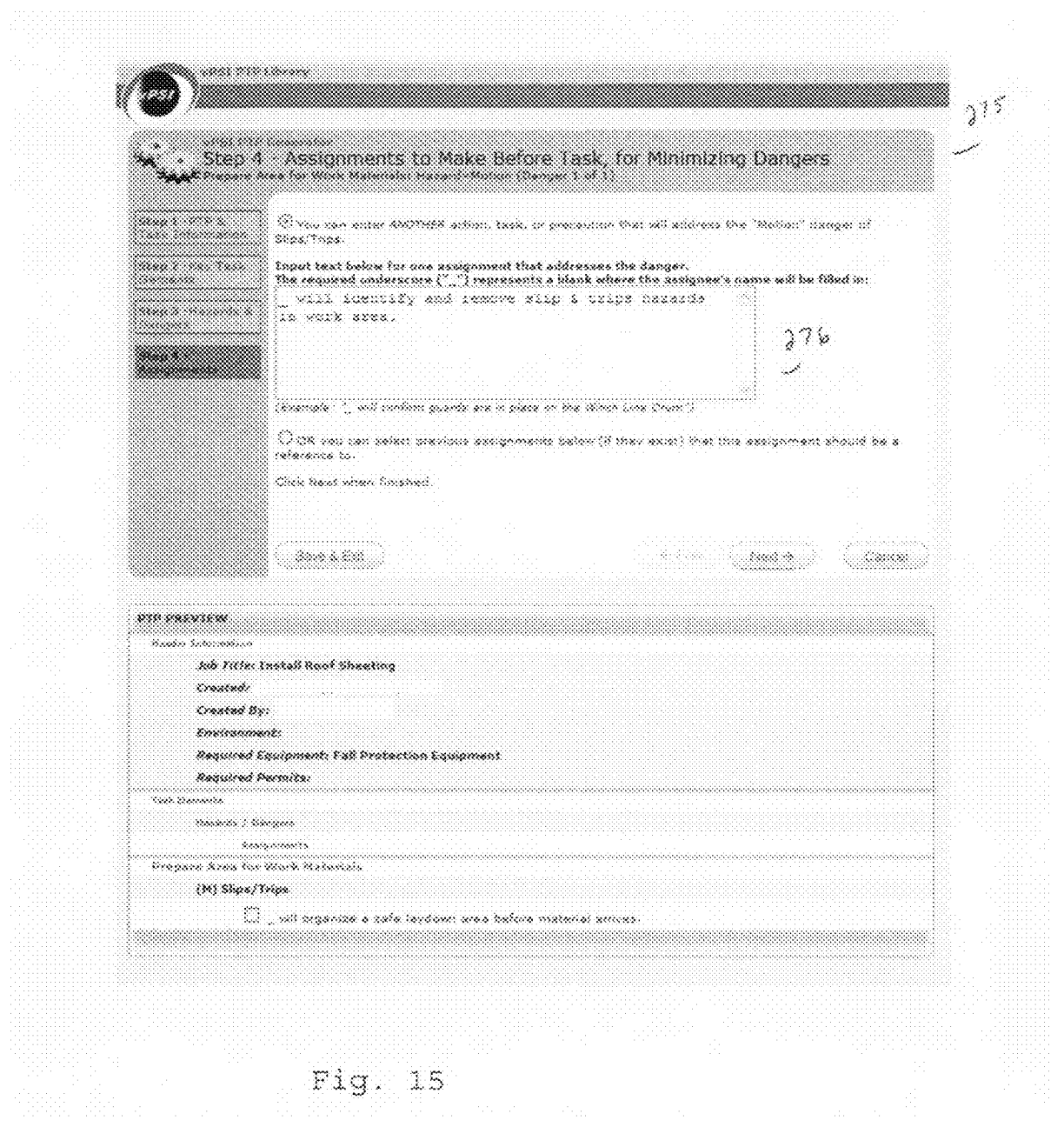

FIG. 15 depicts a dialog box 275 which has a text box 276 for receiving another action, task, or precaution that will address the current hazard danger. In this instance the "Motion" danger of "Slips/Trips".

Figure 28:
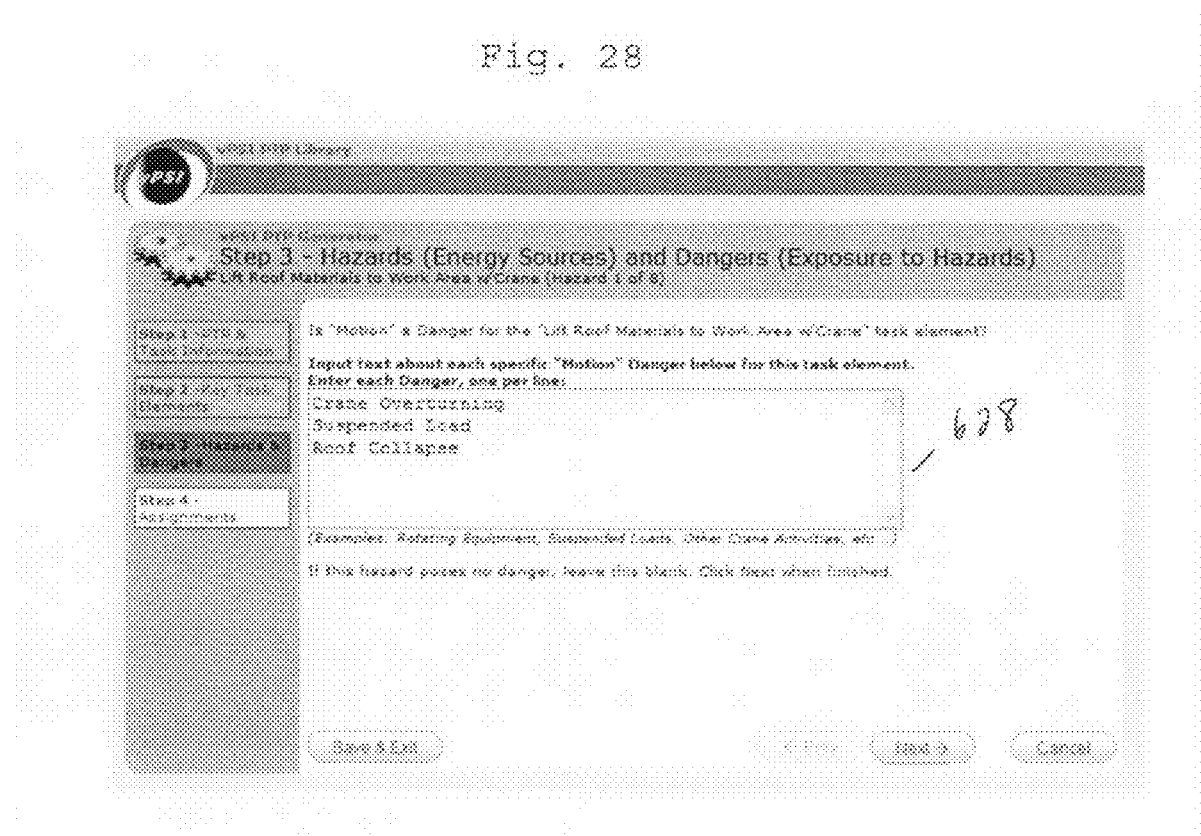
Figure 29:
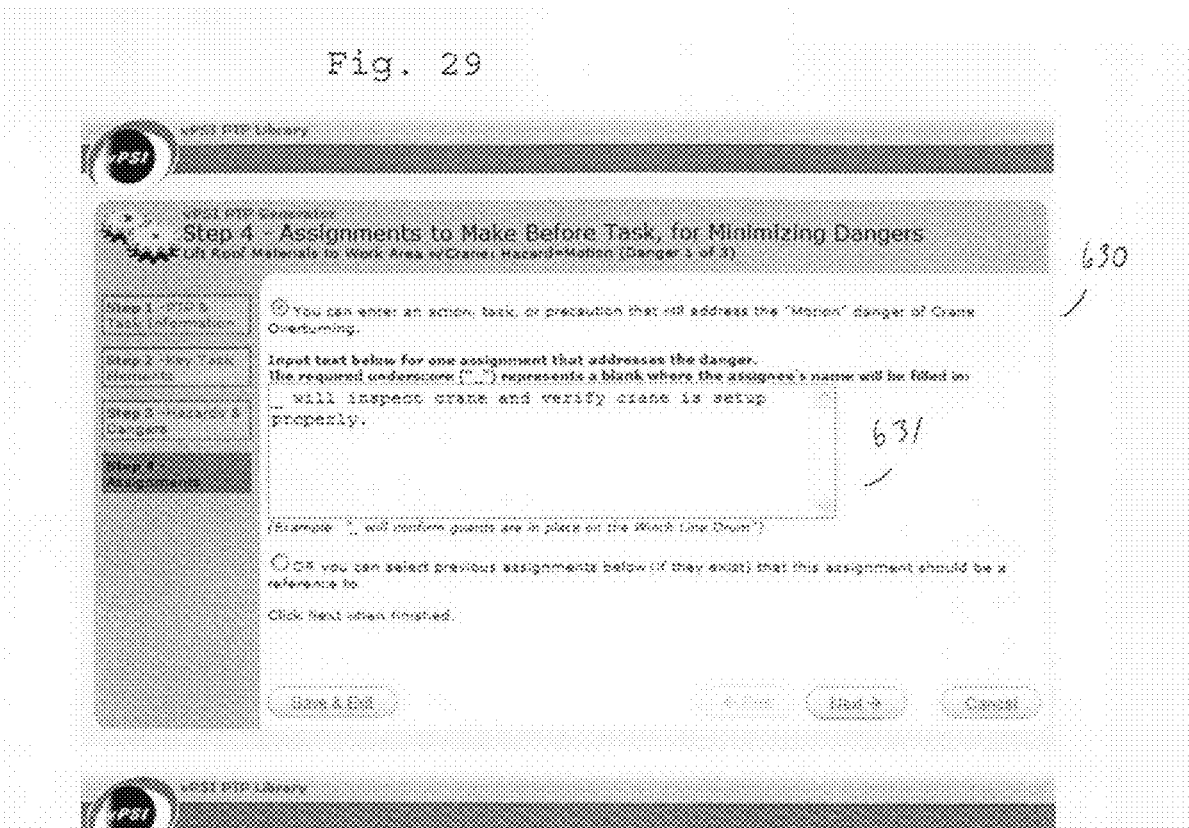
Figure 30:
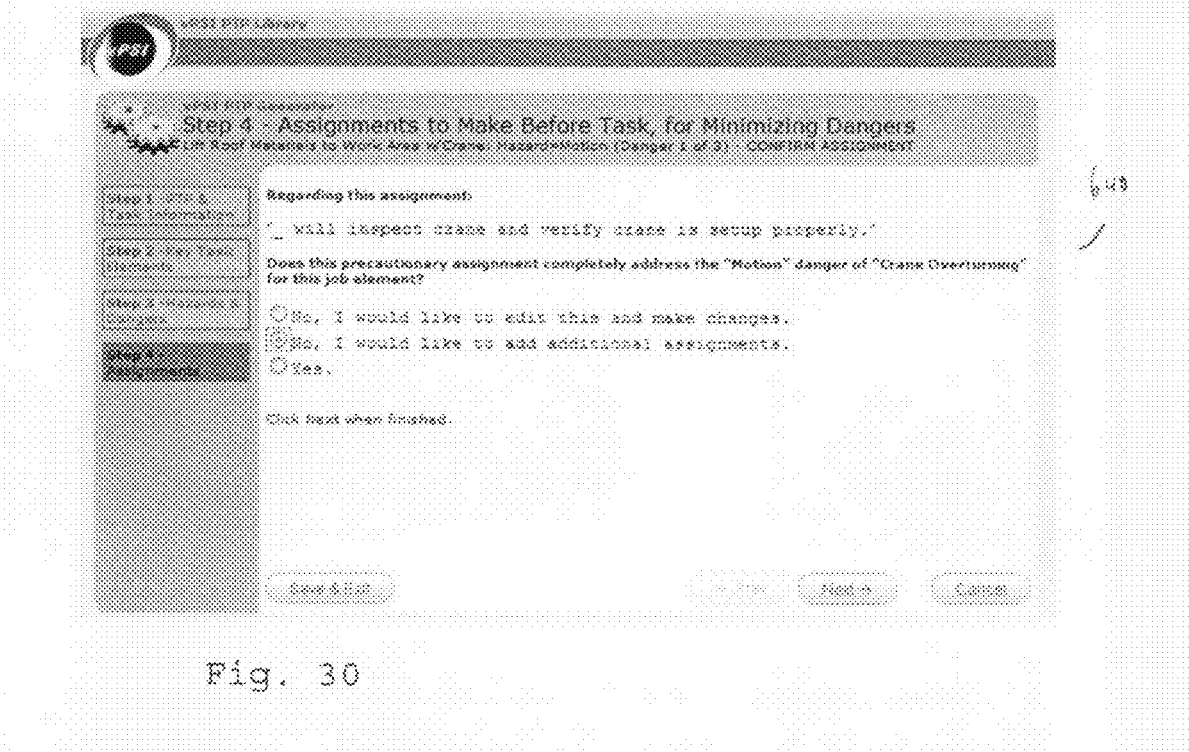
Figure 31:
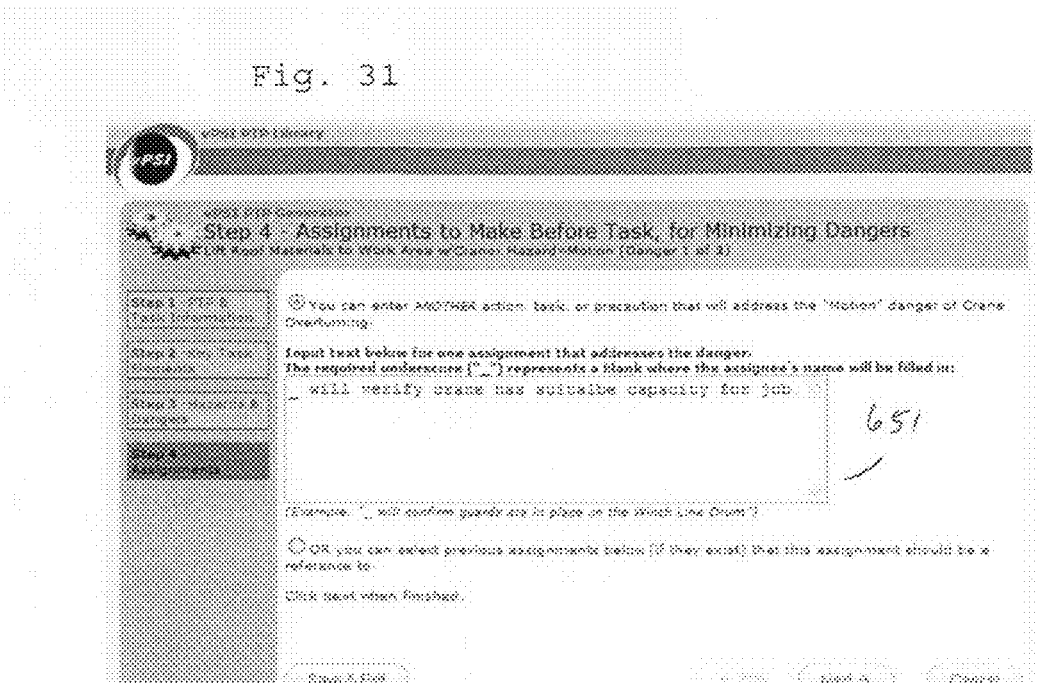

According to step 58, after all dangers for the current hazard have been identified, then the library server 16 moves to the next hazard from the specified group. In particular, FIGS. 16 through 22 having respective dialog boxes 300, 325, 350, 375, 400, 425, and 450 request whether there are any dangers for the remaining hazards of Gravity, Pressure, Thermal, Electricity, Chemical, Radiation, and Biological for the current task or job element according to step 60. As set forth in step 62, library server 16 determines if there are more task or job elements and if so moves to the next job or task element to determine which hazards may pose a danger and the precaution, task, or action that will address that danger. A list of job or task elements are input into Box 477 in dialog box 475 of FIG. 23 to indicate more task or job elements related to changes in task activities, stages or steps. For each of those task elements, the dangers associated with any of the specified hazards will be received by the library server 16. In FIGS. 28 through 54, obtain additional job or task elements, hazard dangers, and the precautions, actions or assignments for each respective hazard danger are collected according to a preferred embodiment of the invention. In particular, FIG. 28 depicts a dialog box 627 with an input box 628 in which has been entered three dangers for the Motion hazard associated with a particular task element that had been previously input into the library server 16. FIG. 29 depicts a dialog box 630 with an input box 631 in which has been entered and action, task, or precaution that will address a Motion danger listed in box 628. In FIG. 30 a dialog box 640 enables the user to indicate whether additional precautionary assignments need to be made to address the identified danger. FIG. 31 depicts a dialog box 650 with a text input box 651 into which has been entered an additional action, task, or precaution that will address a motion danger listed in input box 628.

Figure 32:
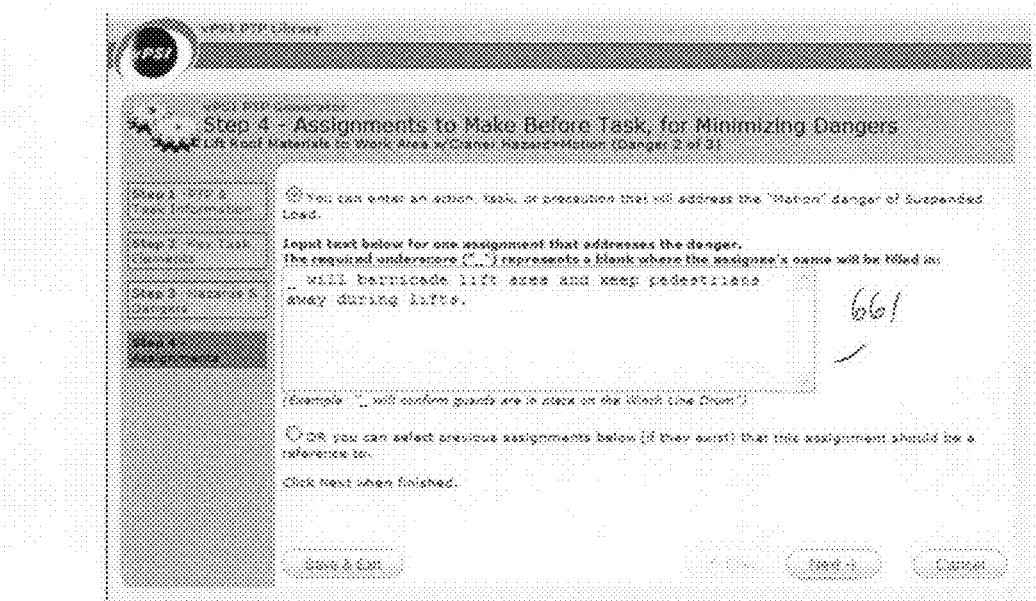
Figure 33:
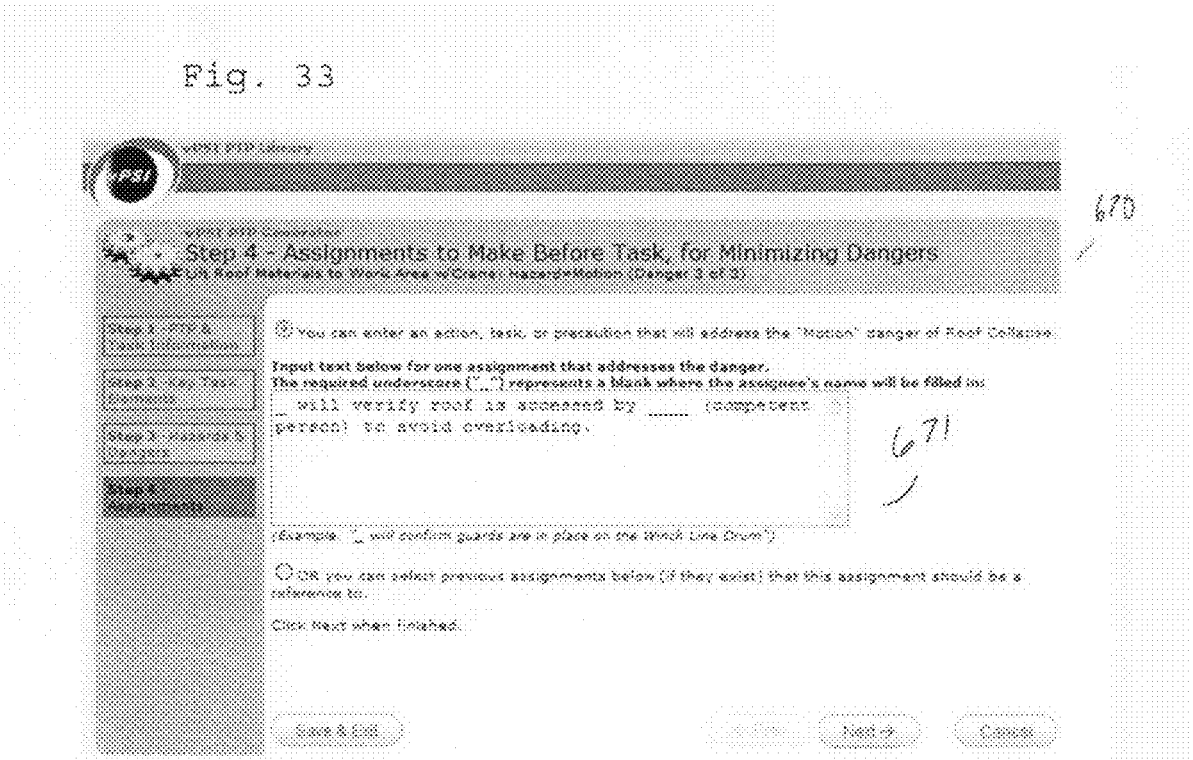
Figure 34:
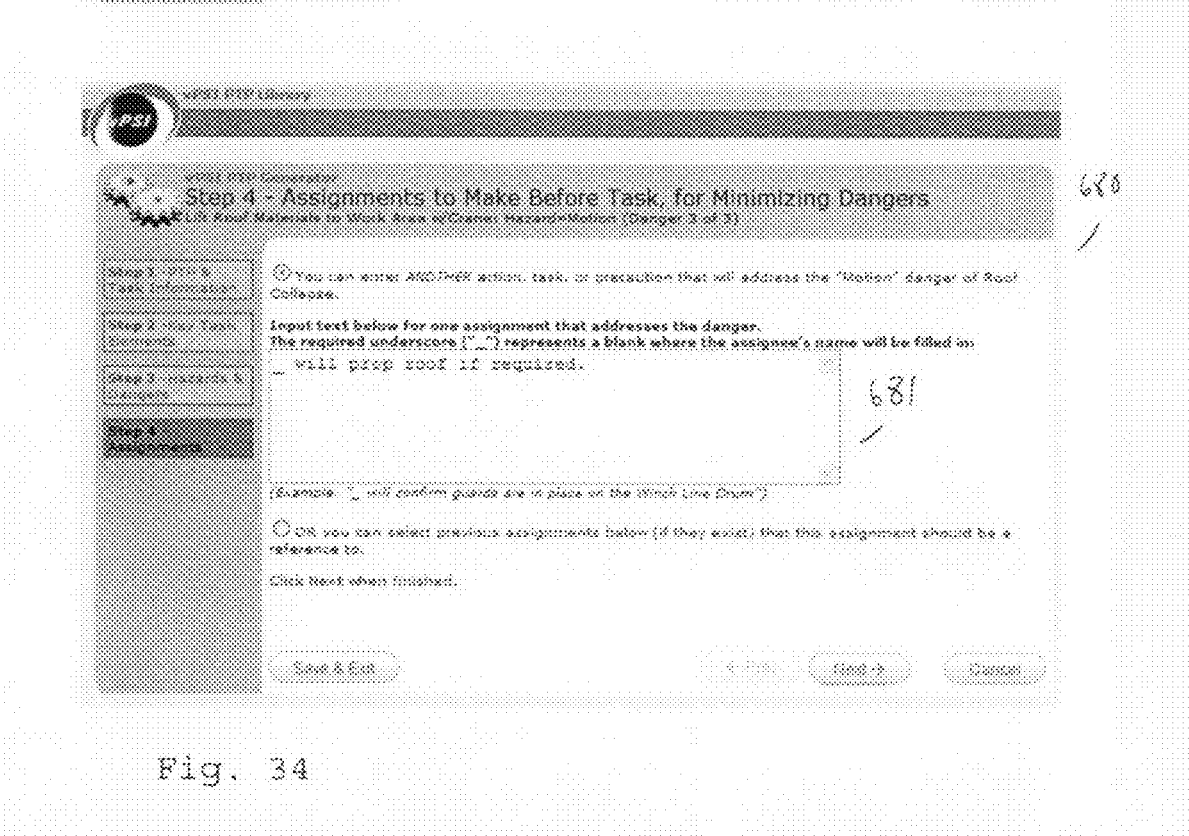

FIG. 32 depicts a dialog box 660 with a text input box 661 into which has been entered and action, task, or precaution that will address another motion danger listed in input box 628. Similarly, FIG. 33 depicts a dialog box 670 with an input box 671 into which has been entered in action, task, or precaution that will address a Motion danger listed in input box 628. FIG. 34 depicts a dialog box 680 with a text input box 681 into which has been entered another action, task, or precaution that will address a Motion danger listed in input box 628.

Figure 35:
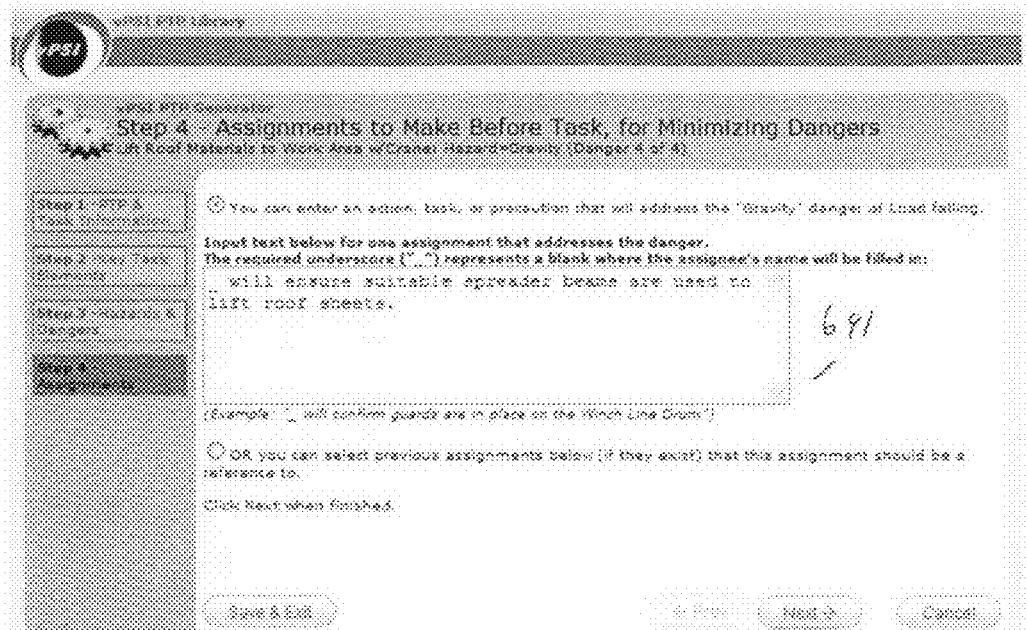
Figure 36:
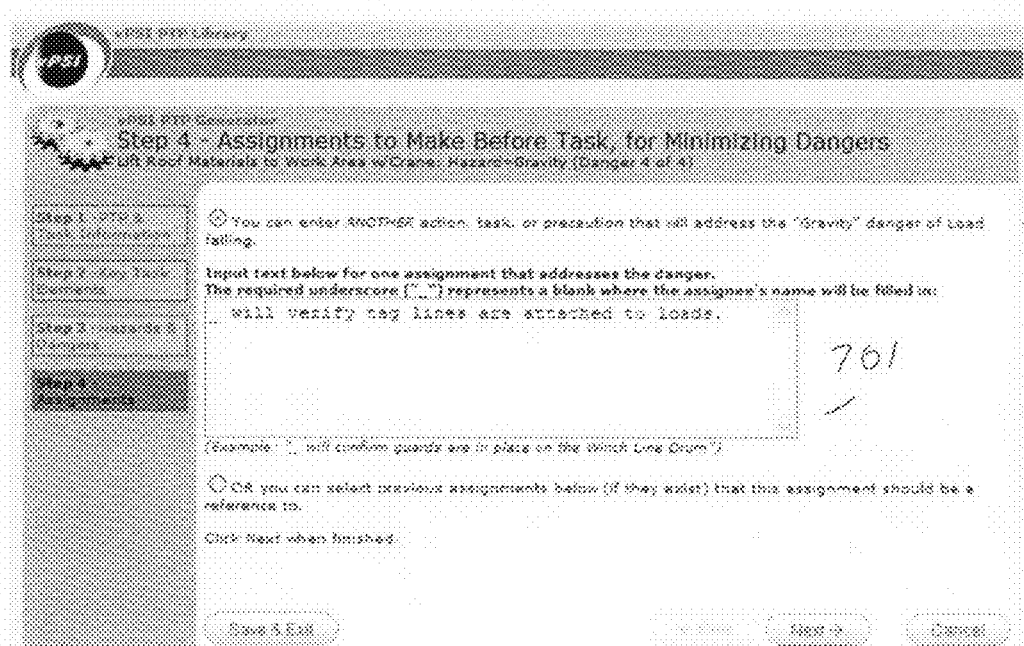
Figure 37:
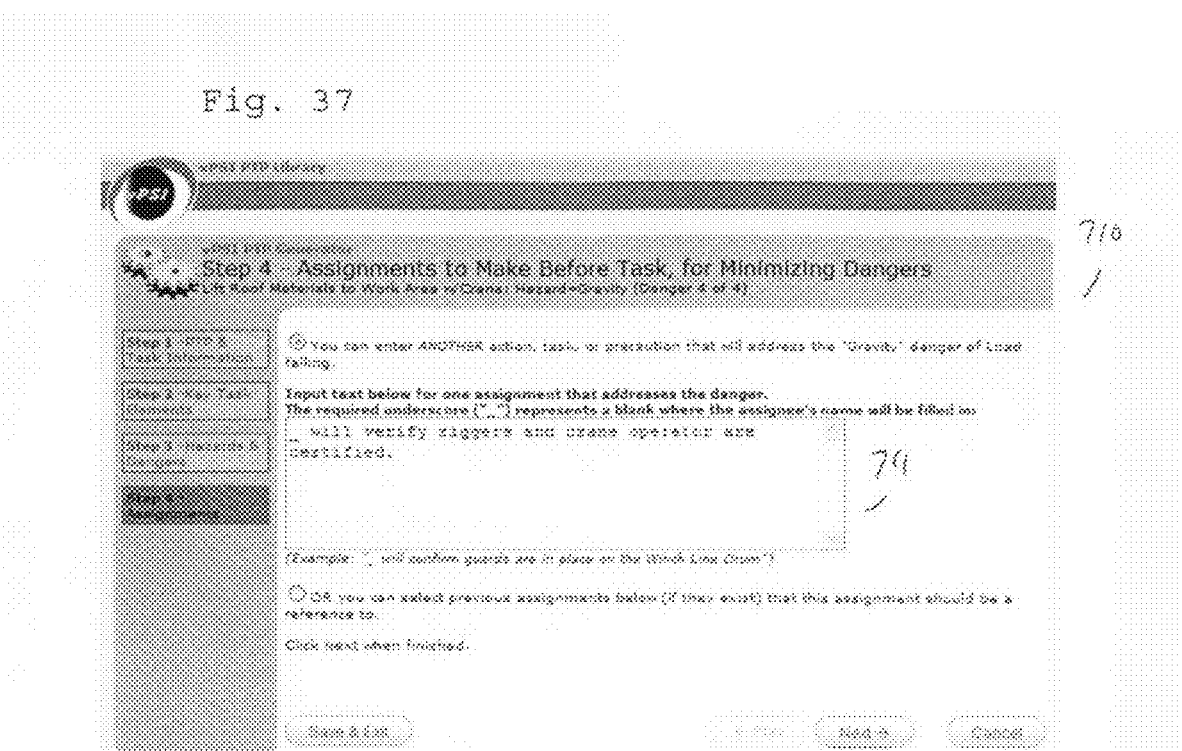
Figure 38:
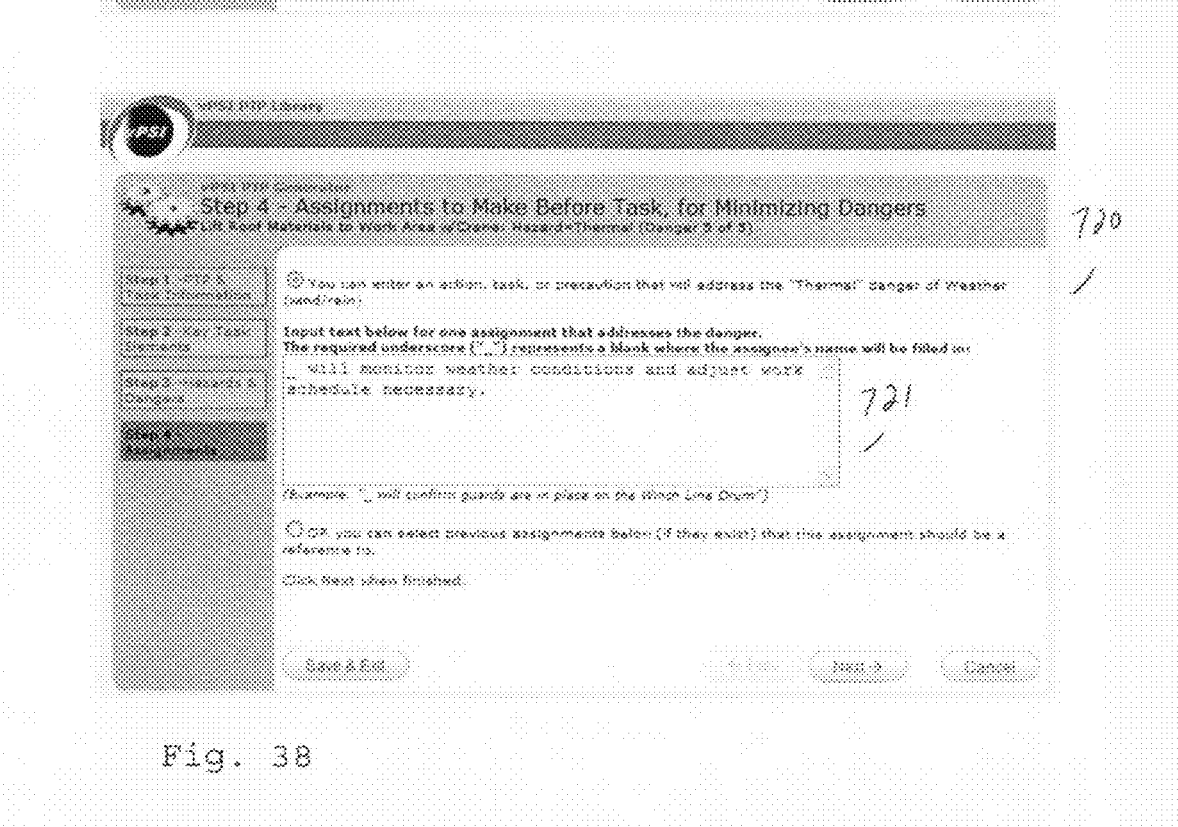
Figures 39, 40:
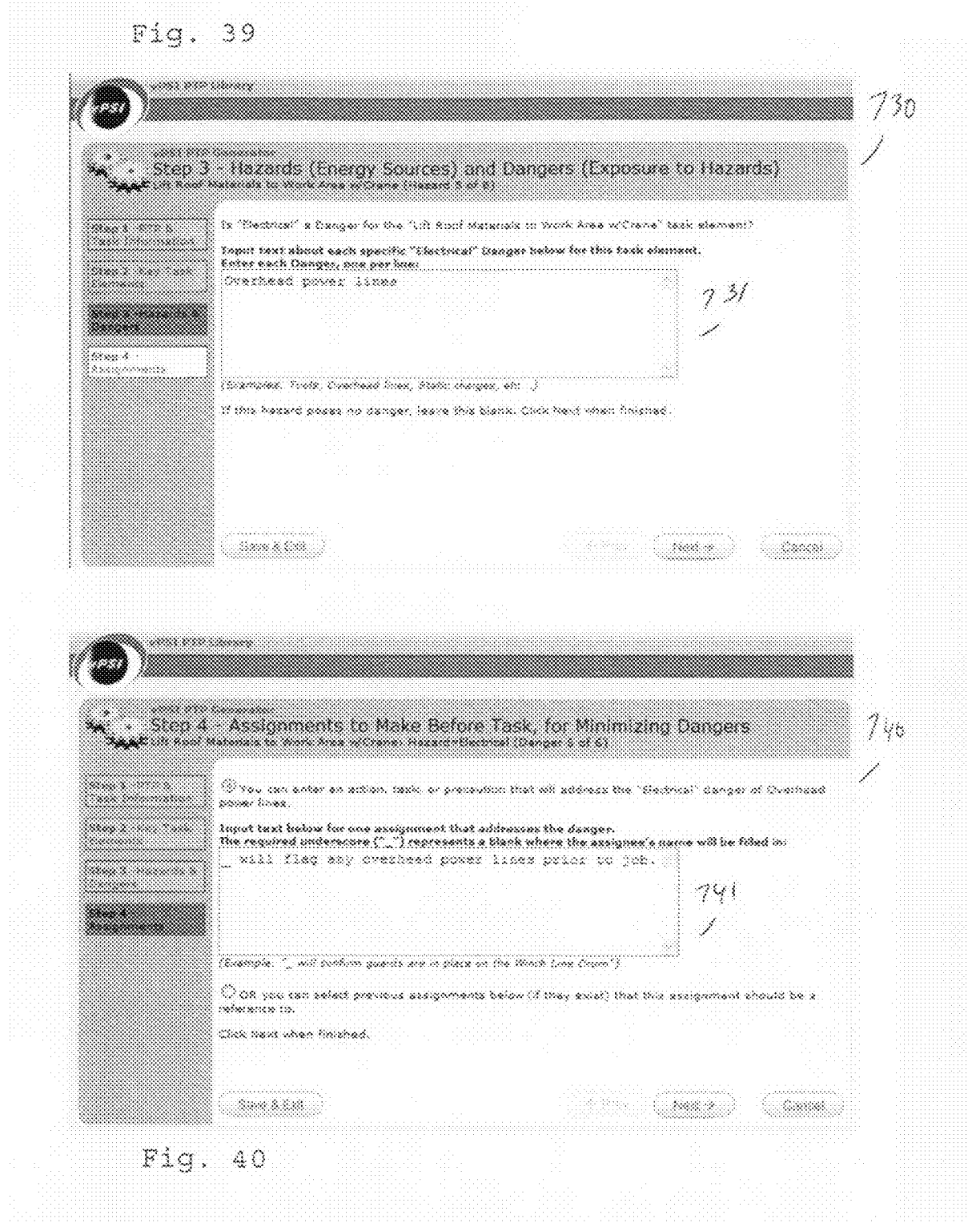
Figures 41, 42:
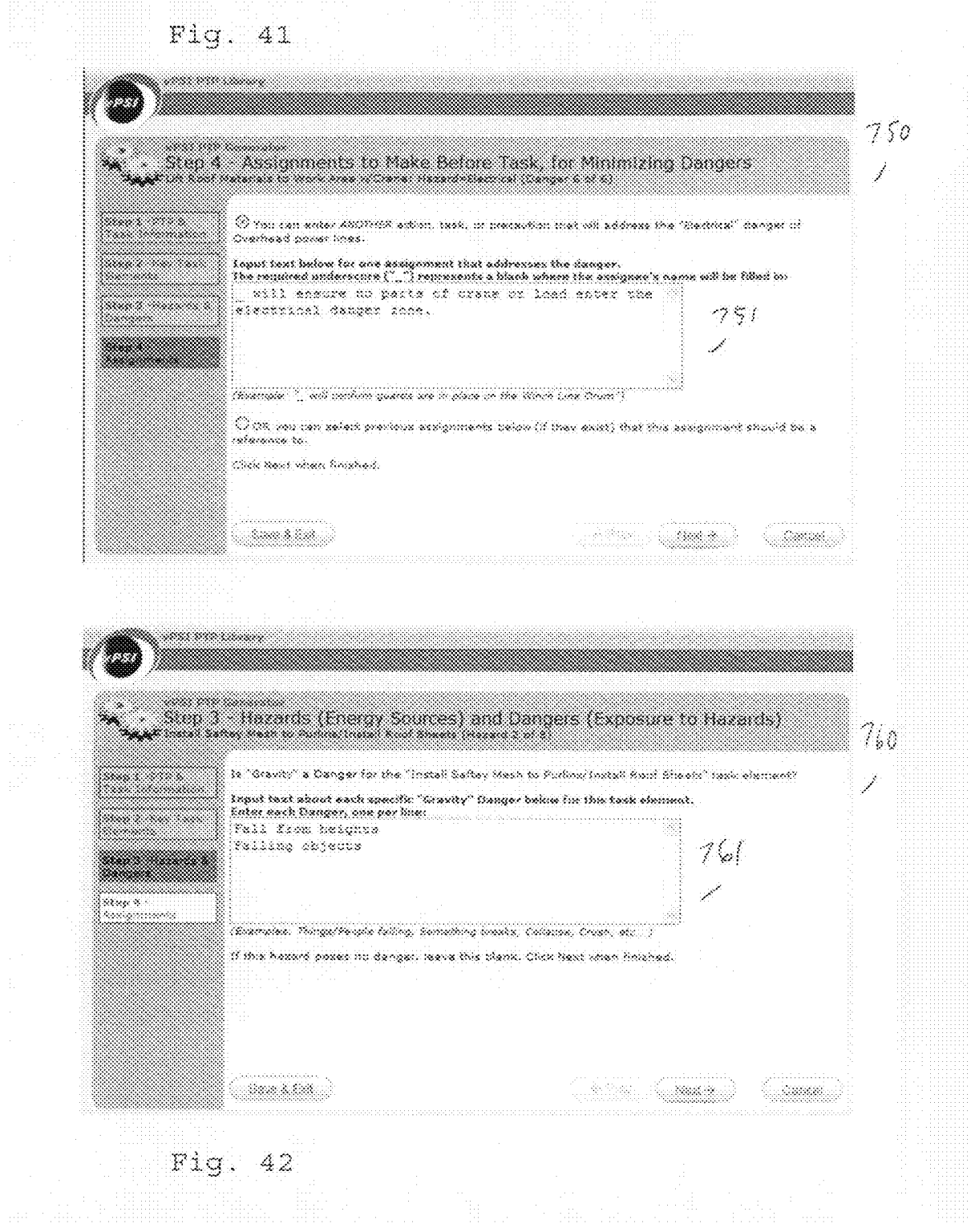
Figure 45:
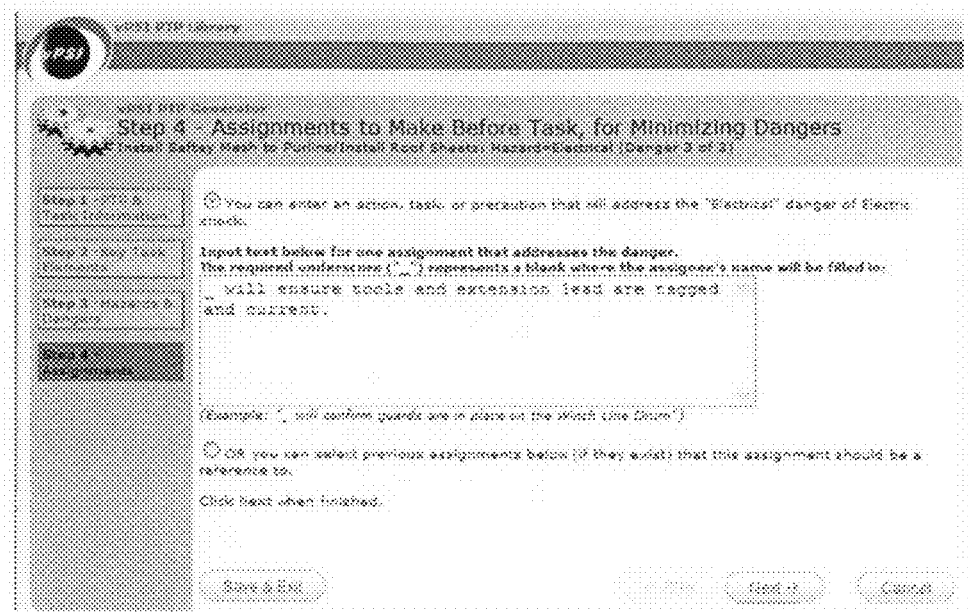
Figure 46:
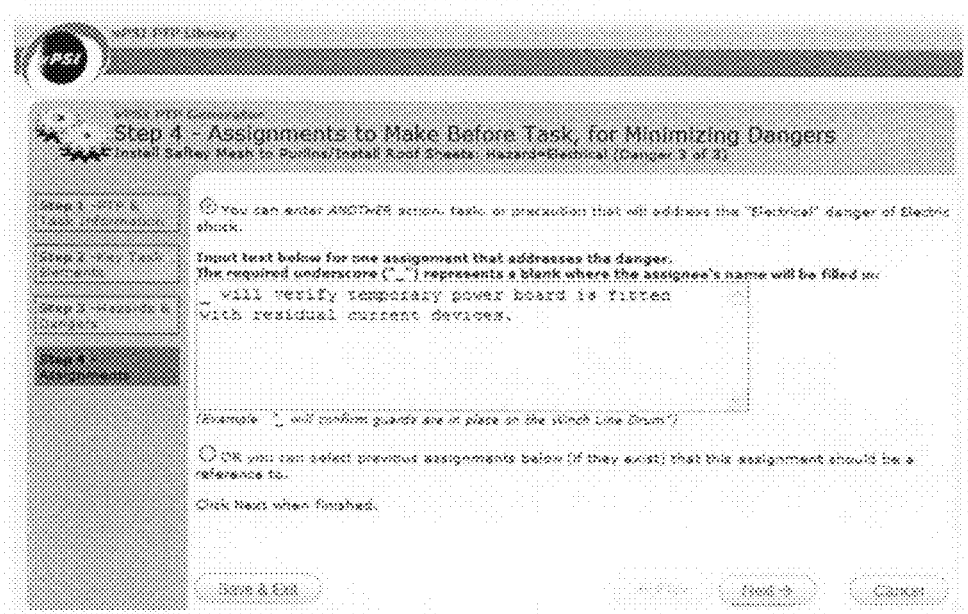
Figure 47:
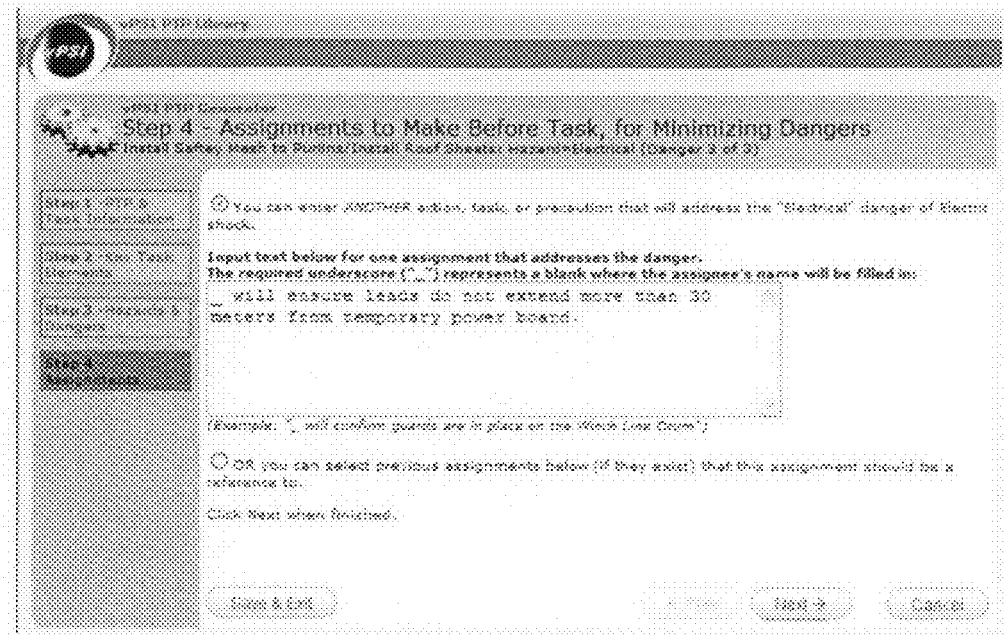
Figure 48:
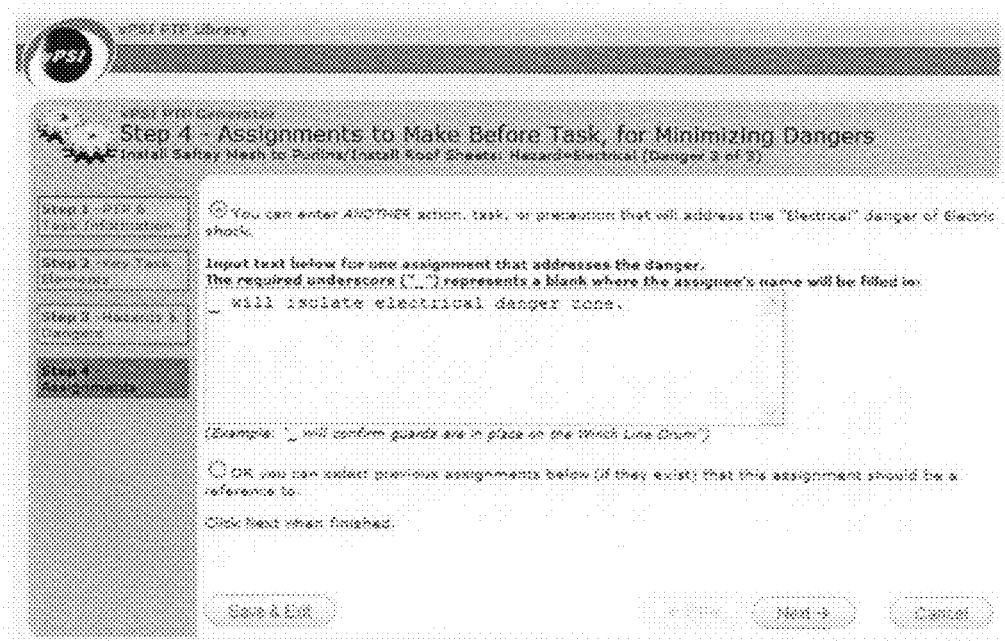

FIGS. 35, 36, 37 depict dialog boxes 690, 700, and 710 each having respective input boxes 691, 701, 711 into which have been entered and action, task, or precaution that will address a Gravity danger for a particular job or task element as identified in the respective dialog boxes. FIG. 38 depicts a dialog box 720 with an input box 721 into which has been entered and action, task, or precaution that will address a Thermal danger for a particular job or task element as identified in the respective dialog box. FIGS. 39, 40 and 41 depicting dialog boxes 730, 740 and 750 with respective input boxes 731, 741, and 751 show a danger for and Electrical hazard being input into text box 731 along with a corresponding action, task, or precautions being input into text boxes 741 and 751 according to the preferred embodiment.

Figure 49:
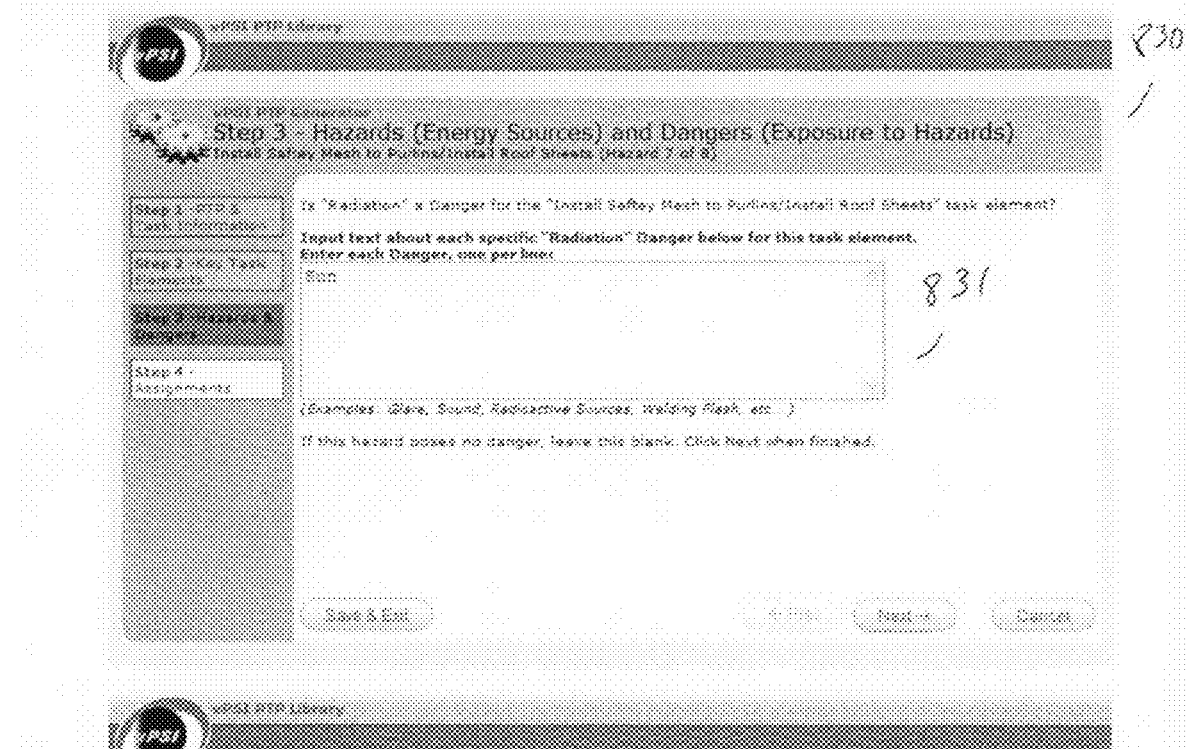
Figure 50:
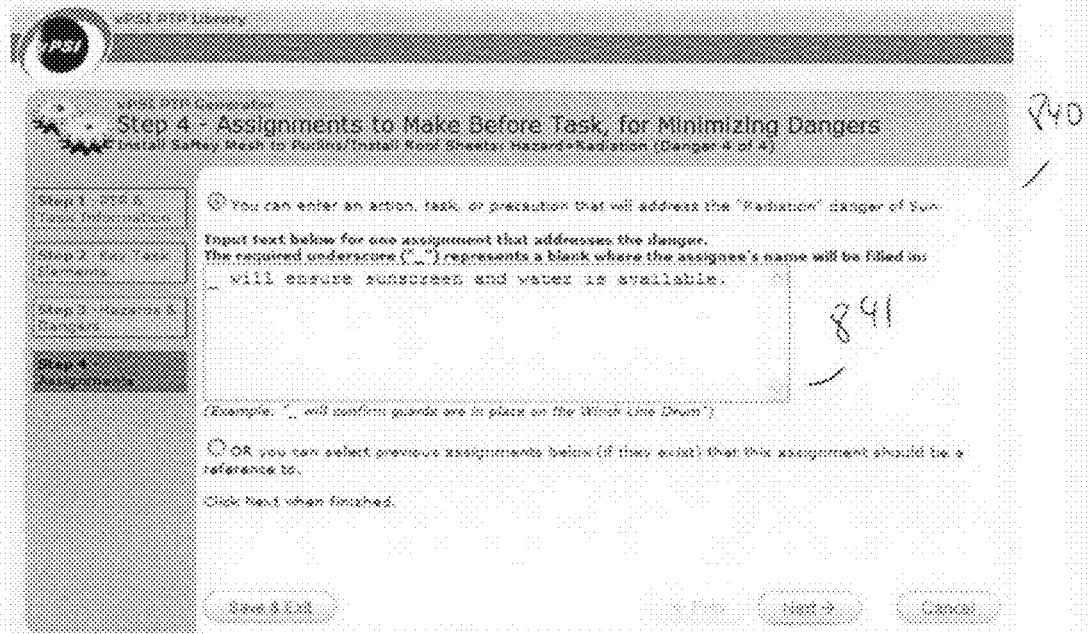

FIG. 42 depicts a dialog box 760 with an input box 761 into which has been entered to Gravity dangers for a particular identified task element. In FIGS. 43 and 44 having dialog boxes 770 and 780 with an action, task, or precaution has been entered into respective input boxes 771 and 781 to address the identified Gravity danger for a particular, task element. FIGS. 45, 46, 47, and 48 having dialog boxes 790, 800, 810, and 820 show of additional actions, tasks, or precautions that will address an identified Electrical danger. In FIG. 49 having a dialog box 830, a user has indicated that the Sun, as listed in text box 831, will pose a Radiation danger for a particular identified task element. In FIG. 50 having a dialog box 840, and action, task, or precaution that will address the respective Radiation danger of the Sun has been input into text box 841 to be received by the library server 16.

Figures 51, 52:
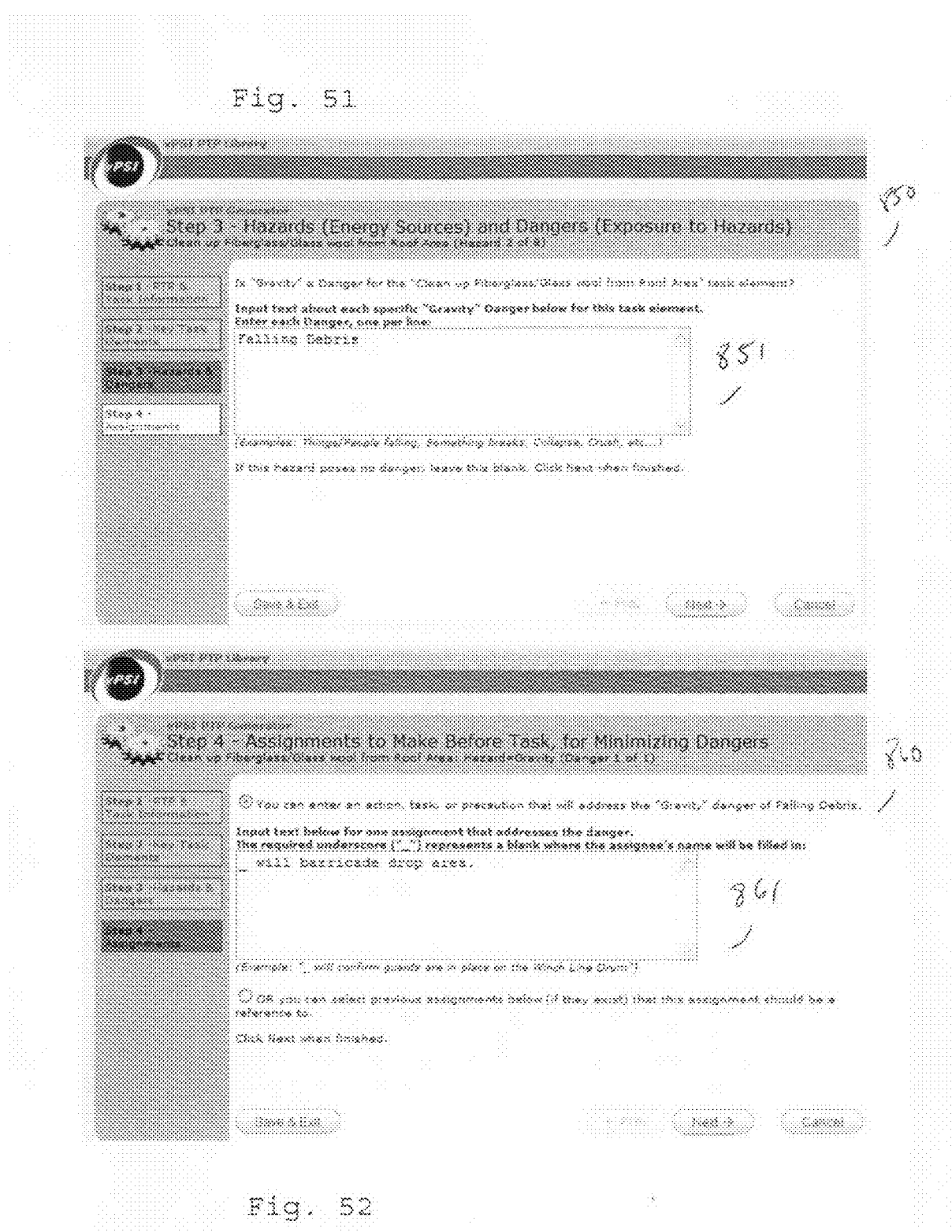

Similarly, in FIG. 51 having a dialog box 850, a user has indicated that "Falling Debris", as listed in text box 851, will pose a Gravity danger for a particular identified task element. In FIG. 52 having a dialog box 860, an action, task, or precaution that will address the respective Gravity danger of Falling Debris has been input into text box 861 to be received by the library server 16.

Figures 53, 54:
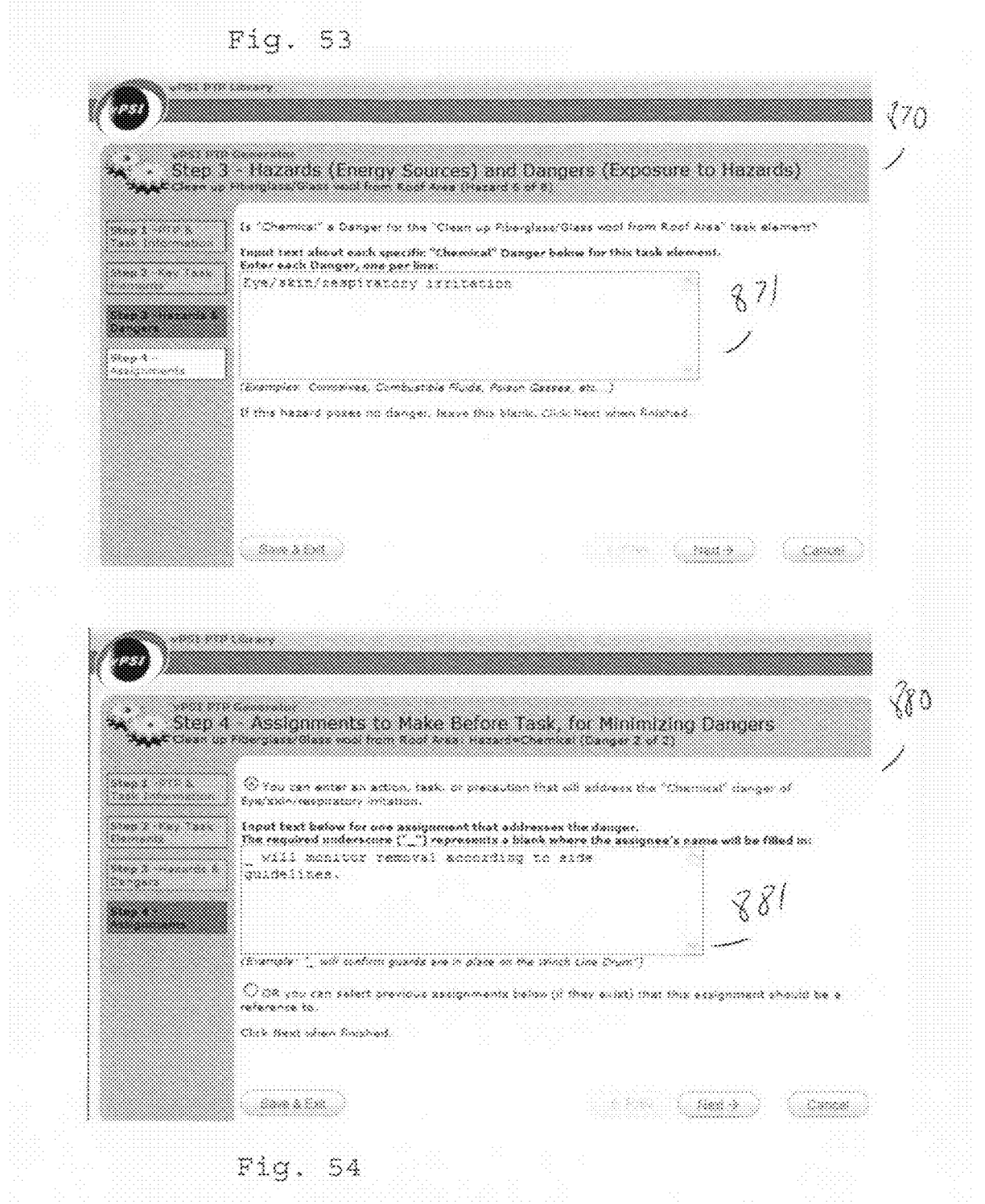
Figure 55:
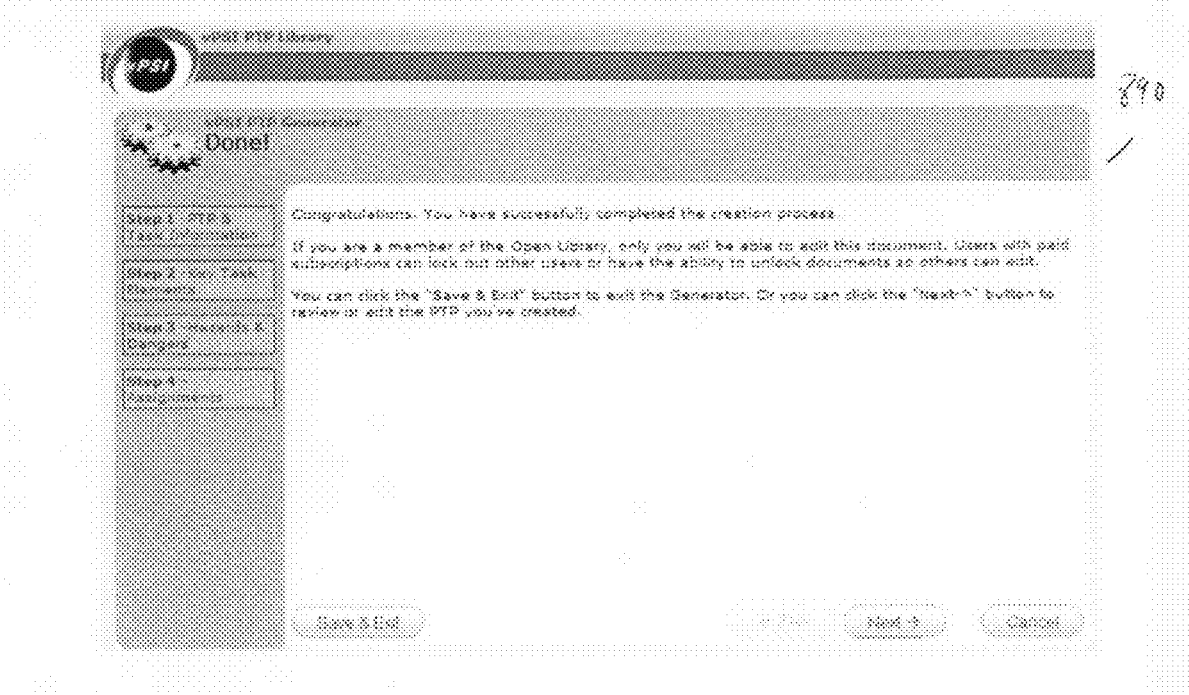

Similarly, in FIG. 53 having a dialog box 870, a user has indicated that Eye/skin/respiratory irritation, as listed in text box 871, may pose a Chemical danger for a particular identified task element. In FIG. 54 having a dialog box 880, an action, task, or precaution that will address the respective Chemical danger has been input into text box 881 to be received by the library server 16. FIG. 55 depicts a dialog box 890 according to a preferred embodiment that indicates that PTP document information input is complete. The user is given a choice to save the completed PTP document to the library or to review or edit the PTP document.

Figure 56:
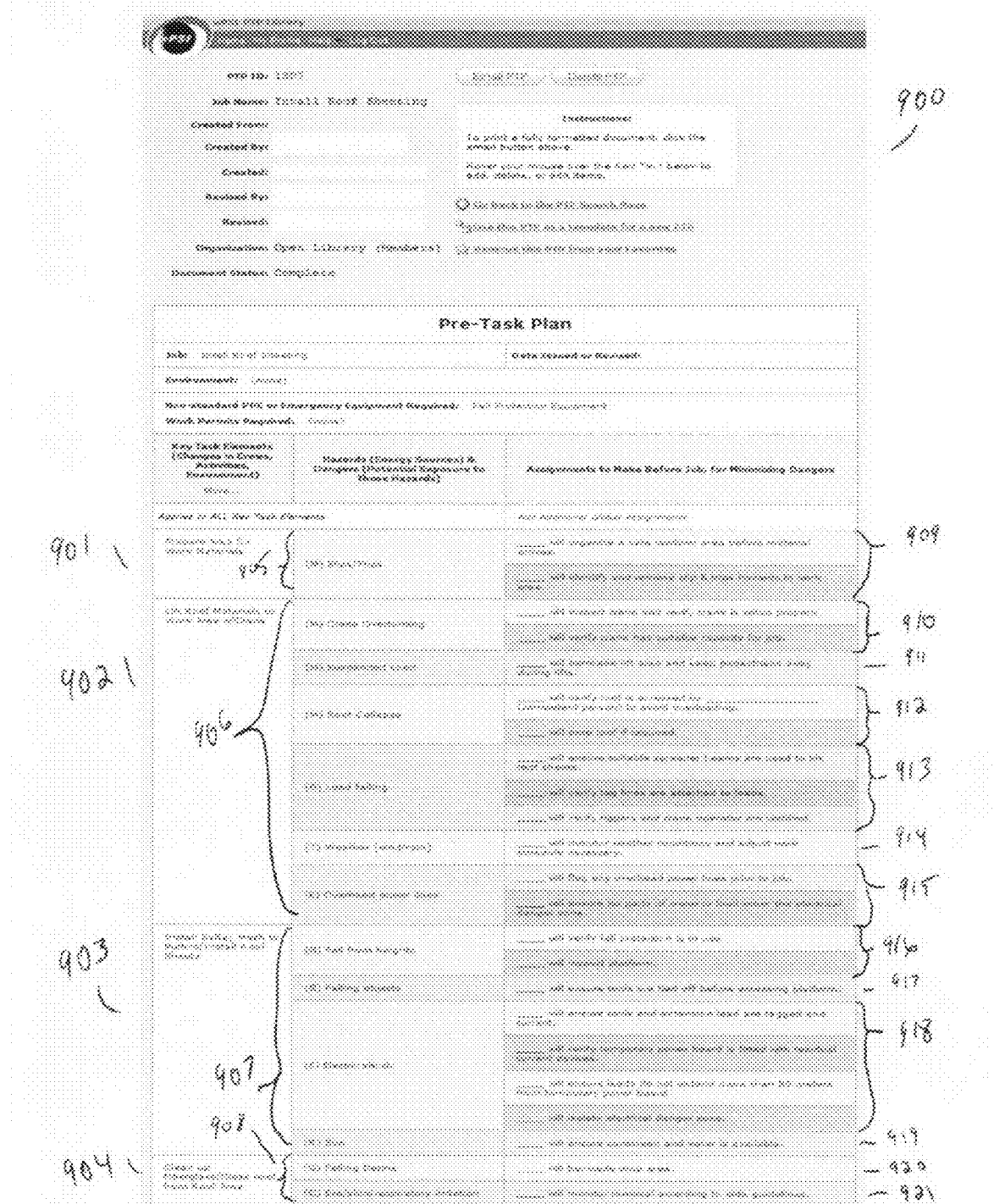
FIG. 56 depicts a completed PTP document according to a preferred embodiment.

According to step 64, FIG. 56 depicts a completed PTP document according to a preferred embodiment. For each key task element 901, 902, 903, and 904, the respective identified hazards 905, 906, 907, and 908 are associated. Further, for each identified hazard, the corresponding actions, tasks, precautions, and assignments 909, 910, 911, 912, 913, 914, 915, 916, 917, 918, 919, 920, and 921 are set forth along with an indication and blank space to make assignments to individual prior to the job in order to minimize the identified dangers. As set forth in step 66 the user may then print, export, or share the completed PTP document according the library server 16 policies and permissions.

A database according to a preferred embodiment described herein, may include data storage tables operable to maintain and store information such as that set forth in FIGS. 57A-E. FIG. 57A illustrates data fields that may be kept in a database according to a preferred embodiment for each PTP Document. Each PTP Document may have one or more task elements that may be performed to complete or substantially complete the task associated with the PTP Document. FIG. 57B illustrates data fields that may be included for each task element that may be performed for each task associated with each PTP Document. For each task element, there may be one more hazards and/or dangers. FIG. 57C illustrates data fields that may be included for each hazard and/or danger associated with each task element. For each hazard and/or danger, one or more assignments may be made to mitigate the hazard and/or danger. FIG. 57D illustrates data fields that may be included for each hazard or danger. Finally, a PTP Document may also include global assignments that apply to all key task elements. FIG. 57E illustrates data fields that may be included for each global assignment.

In a preferred embodiment, PTP Documents may be transmitted or delivered electronically over a network to user in a predetermined document format and arranged according to a predetermined format or template. It is understood that certain organizations or companies may have a standardized template approved for pre task planning documents. In a preferred embodiment the information collected by the library server can be arranged into a predetermined template according to a user or entities predetermined specification so that each PTP Document meets the organizations standardized requirements. FIG. 58 shows a generic template which can be used to report the PTP Document. Labels are shown which associate with information -related to the PTP Document and which can be inserted into the template. In another embodiment shown in FIG. 59, PTP Document templates can be tailored for a particular company and include the company name and logo such that the PTP Document library server populates the template prior to delivery and creates a customized PTP Document that uniquely identifies the respective company or entity. These documents can then be delivered and distributed to the appropriate personnel and indicate to those personnel that the information originates from the identified company and the instructions contained in the document should be followed.

The above described embodiments of the invention are provided for illustration purposes, and the invention should not be limited to the embodiments shown and described, as it will be readily apparent to those of skill in the art that other embodiments of the invention are possible. Many modifications and variations of the present invention are possible in light of the above teachings. It is therefore to be understood that, within the scope of the appended claims, the invention may be practiced otherwise than as specifically described.

What is claimed is:

1. A library system for creating, maintaining and distributing pre task planning documents, comprising:
    a) at least one data storage system with a database, said database operable for storing information relating to one or more users and information relating to one or more pre task planning documents which relate to a task;
    b) a library computer server in communication with said data storage system and said database and operable to
        i) communicate over a network with at least one user through said user's client computer to receive a first set of pre task planning information; said first set of pre task planning information including information indicative of a first task, one or more task elements associated with accomplishing said first task, for each of said task elements information indicative of one or more hazards associated with said task element, and for each of said hazards a description of one or more assignments to be made prior to the start of said first task to address said respective hazard;
        ii) create a first pre task planning document by processing said first set of information into a form acceptable to said database;
        iii) associate said first set of information with said at least one user; and
        iv) store said first set of information in said database with an association with said user;
        v) assemble said first set of information into a predetermined arrangement; and
        vi) deliver said predetermined arrangement to a user over said network.

2. The library system according to claim 1 wherein said one or more hazards are taken from the group of motion, gravity, pressure, thermal, electrical, chemical, radiation and biological.

3. The library system according to claim 1 wherein said predetermined arrangement includes a predetermined computer file type.

4. The library system according to claim 2 wherein said predetermined arrangement includes a predetermined file type.

5. A method for creating and maintaining pre task planning documents, the steps comprising:
    creating a database on a data storage system operable for storing information relating to one or more users and information relating to one or more pre task planning documents which relate to a task;
    receiving over an electronic network a first set of pre task planning information; said first set of pre task planning information including information indicative of a first task, one or more task elements associated with accomplishing said first task, for each of said task elements information indicative of one or more hazards associated with said task element, and for each of said hazards a description of one or more assignments to be made prior to the start of said first task to address said respective hazard;
    creating one or more records in said database configured to receive said first set of information;
    storing said first set of information in said database;
    assembling said first set of information into a predetermined arrangement; and
    delivering said predetermined arrangement to a user over said network.

6. The method of claim 5 wherein said one or more hazards are taken from the group of motion, gravity, thermal, electrical, chemical, radiation and biological.

* * * * *